US012675856B2

(12) United States Patent
Xu et al.

(10) Patent No.: US 12,675,856 B2
(45) Date of Patent: Jul. 7, 2026

(54) DYNAMIC RANGE MAPPING METHOD AND APPARATUS FOR PANORAMIC VIDEO

(71) Applicant: HUAWEI TECHNOLOGIES CO., LTD., Shenzhen (CN)

(72) Inventors: Weiwei Xu, Hangzhou (CN); Haitao Yang, Shenzhen (CN); Quanhe Yu, Beijing (CN); Hu Chen, Munich (DE); Yichuan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 18/743,607

(22) Filed: Jun. 14, 2024

(65) Prior Publication Data

US 2024/0331117 A1      Oct. 3, 2024

Related U.S. Application Data

(63) Continuation of application No. PCT/CN2022/133506, filed on Nov. 22, 2022.

(30) Foreign Application Priority Data

Dec. 17, 2021      (CN) .......................... 202111555880.5

(51) Int. Cl.
*G06K 9/00*          (2022.01)
*G06T 5/90*          (2024.01)
      (Continued)

(52) U.S. Cl.
CPC .................. *G06T 5/90* (2024.01); *G06T 7/11* (2017.01); *G06T 15/00* (2013.01)

(58) Field of Classification Search
CPC ... G06T 5/90; G06T 7/11; G06T 15/00; G06T 3/06; G06T 3/4038; G06T 5/40; G06T 2207/10016
See application file for complete search history.

(56) References Cited

U.S. PATENT DOCUMENTS

2018/0374192 A1* 12/2018 Kunkel .................. H04N 23/58
2021/0192678 A1    6/2021 Wang

FOREIGN PATENT DOCUMENTS

CN        106534827 A      3/2017
CN        107622474 A      1/2018
      (Continued)

OTHER PUBLICATIONS

SMPTE Standard:"Dynamic Metadata for Color Volume Transform Core Components", ST 2094-1, May 18, 2016, total 15 pages.
      (Continued)

*Primary Examiner* — Duy M Dang

(57) ABSTRACT

A dynamic range mapping method and apparatus for a panoramic video that relate to the field of video image processing are provided. The method includes: splitting a two-dimensional panoramic projection image corresponding to any frame of three-dimensional panoramic image in a panoramic video, to obtain a plurality of regions of the two-dimensional panoramic projection image; obtaining metadata of the two-dimensional panoramic projection image, where the metadata includes metadata information elements separately corresponding to the plurality of regions, and a metadata information element corresponding to one region includes dynamic mapping information of the region; determining dynamic mapping information of each pixel in a current angle of view range based on respective dynamic mapping information of the plurality of regions; and performing dynamic range mapping on each pixel in the current angle of view range, to obtain a two-dimensional panoramic projection image that is used for display or subsequent processing.

20 Claims, 14 Drawing Sheets

(51) Int. Cl.
*G06T 7/11* (2017.01)
*G06T 15/00* (2011.01)

(56) References Cited

FOREIGN PATENT DOCUMENTS

| | | | |
|---|---|---|---|
| CN | 107886468 | A | 4/2018 |
| CN | 112770178 | A | 5/2021 |
| EP | 3499894 | A1 | 6/2019 |
| EP | 3672251 | A1 | 6/2020 |
| JP | 2019515572 | A | 6/2019 |
| JP | 2019531674 | A | 10/2019 |
| WO | 2018214698 | A1 | 11/2018 |

OTHER PUBLICATIONS

ITU-R Recommendation ITU-R BT.1886, Reference electro-optical transfer function for flat panel displays used in HDTV studio production. BT Series Broadcasting service(television), Radiocommunication Sector of ITU, Mar. 2011, 7 pages.
International Search Report and Written Opinion issued in PCT/CN2022/133506, dated Feb. 6, 2023, 7 pages.

* cited by examiner

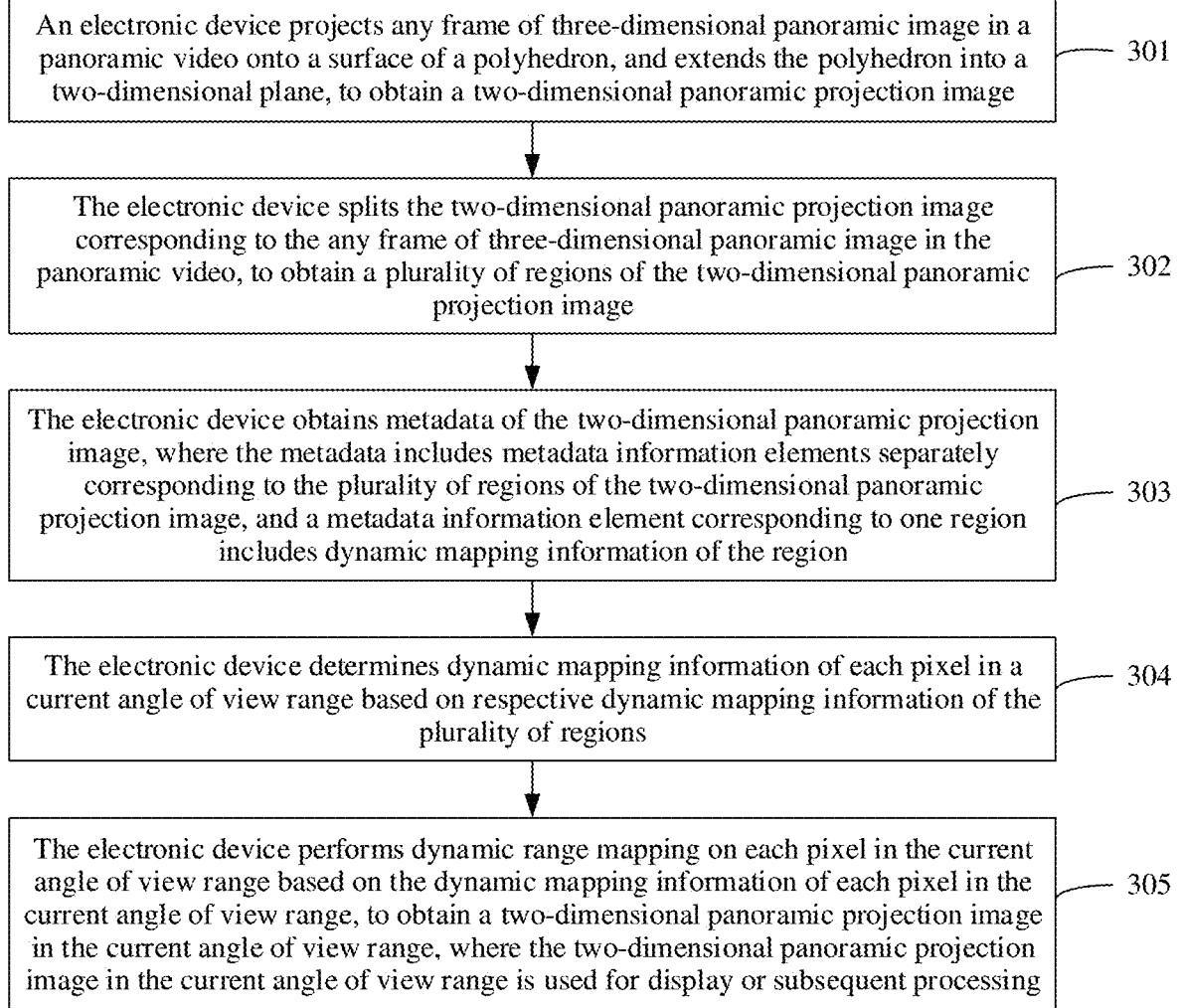

An electronic device projects any frame of three-dimensional panoramic image in a panoramic video onto a surface of a polyhedron, and extends the polyhedron into a two-dimensional plane, to obtain a two-dimensional panoramic projection image — 301

The electronic device splits the two-dimensional panoramic projection image corresponding to the any frame of three-dimensional panoramic image in the panoramic video, to obtain a plurality of regions of the two-dimensional panoramic projection image — 302

The electronic device obtains metadata of the two-dimensional panoramic projection image, where the metadata includes metadata information elements separately corresponding to the plurality of regions of the two-dimensional panoramic projection image, and a metadata information element corresponding to one region includes dynamic mapping information of the region — 303

The electronic device determines dynamic mapping information of each pixel in a current angle of view range based on respective dynamic mapping information of the plurality of regions — 304

The electronic device performs dynamic range mapping on each pixel in the current angle of view range based on the dynamic mapping information of each pixel in the current angle of view range, to obtain a two-dimensional panoramic projection image in the current angle of view range, where the two-dimensional panoramic projection image in the current angle of view range is used for display or subsequent processing — 305

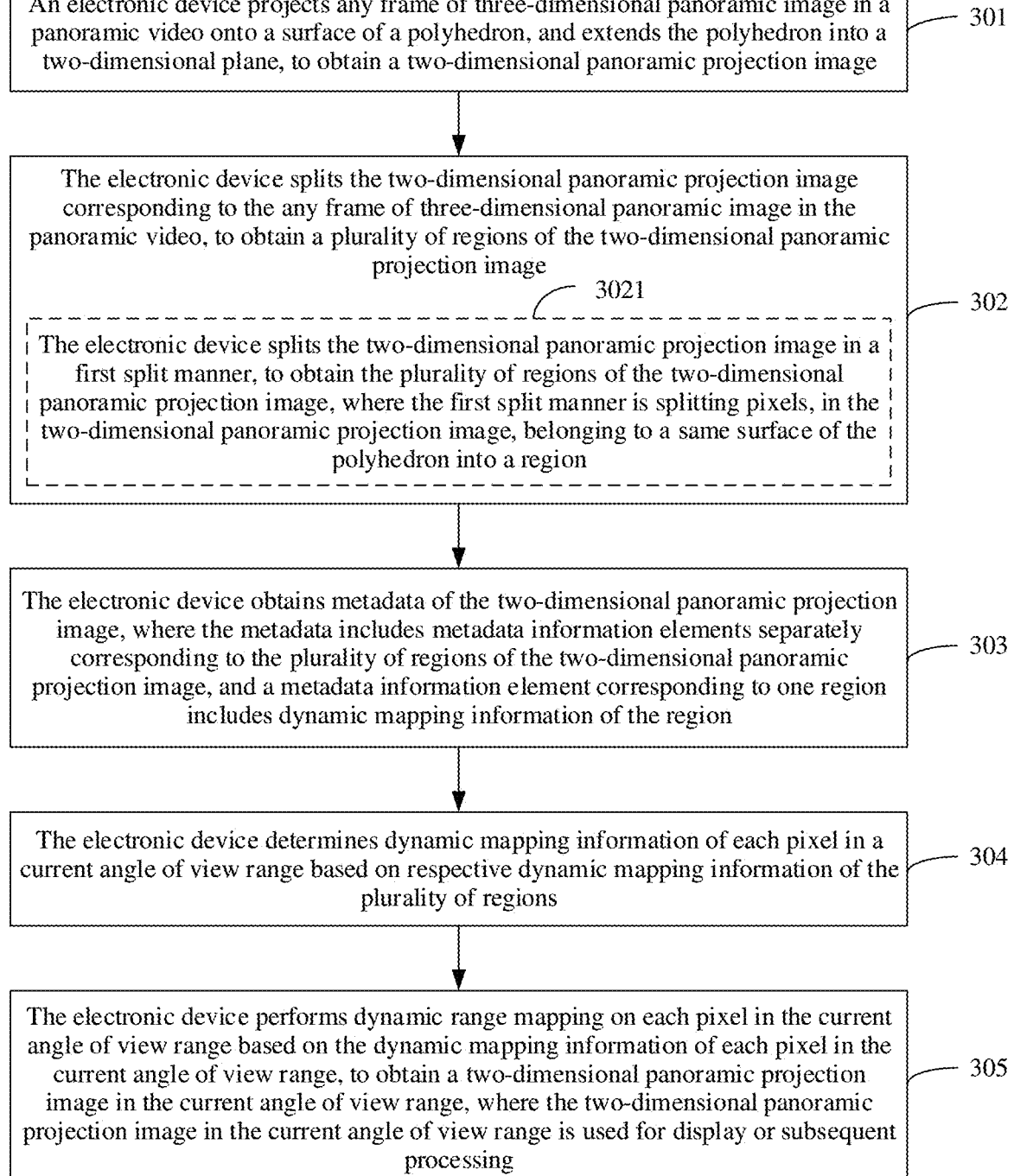

An electronic device projects any frame of three-dimensional panoramic image in a panoramic video onto a surface of a polyhedron, and extends the polyhedron into a two-dimensional plane, to obtain a two-dimensional panoramic projection image — 301

The electronic device splits the two-dimensional panoramic projection image corresponding to the any frame of three-dimensional panoramic image in the panoramic video, to obtain a plurality of regions of the two-dimensional panoramic projection image

3021

The electronic device splits the two-dimensional panoramic projection image in a first split manner, to obtain the plurality of regions of the two-dimensional panoramic projection image, where the first split manner is splitting pixels, in the two-dimensional panoramic projection image, belonging to a same surface of the polyhedron into a region

— 302

The electronic device obtains metadata of the two-dimensional panoramic projection image, where the metadata includes metadata information elements separately corresponding to the plurality of regions of the two-dimensional panoramic projection image, and a metadata information element corresponding to one region includes dynamic mapping information of the region — 303

The electronic device determines dynamic mapping information of each pixel in a current angle of view range based on respective dynamic mapping information of the plurality of regions — 304

The electronic device performs dynamic range mapping on each pixel in the current angle of view range based on the dynamic mapping information of each pixel in the current angle of view range, to obtain a two-dimensional panoramic projection image in the current angle of view range, where the two-dimensional panoramic projection image in the current angle of view range is used for display or subsequent processing — 305

FIG. 7

| 4 | 0 | 5 |
|---|---|---|
| 3 | 1 | 2 |

| A | B | C |
|---|---|---|
| D | E | F |

FIG. 8

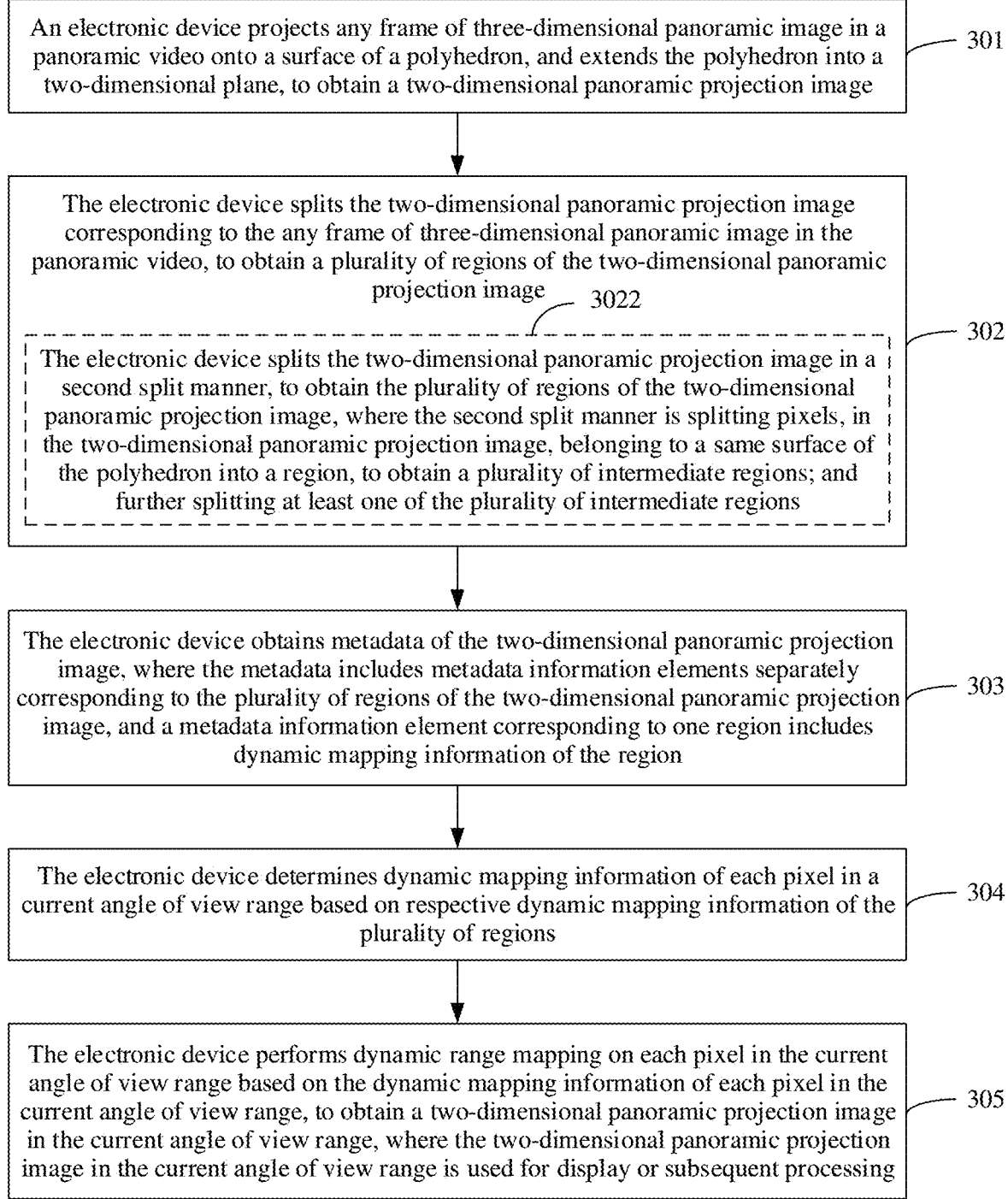

An electronic device projects any frame of three-dimensional panoramic image in a panoramic video onto a surface of a polyhedron, and extends the polyhedron into a two-dimensional plane, to obtain a two-dimensional panoramic projection image — 301

The electronic device splits the two-dimensional panoramic projection image corresponding to the any frame of three-dimensional panoramic image in the panoramic video, to obtain a plurality of regions of the two-dimensional panoramic projection image — 3022

The electronic device splits the two-dimensional panoramic projection image in a second split manner, to obtain the plurality of regions of the two-dimensional panoramic projection image, where the second split manner is splitting pixels, in the two-dimensional panoramic projection image, belonging to a same surface of the polyhedron into a region, to obtain a plurality of intermediate regions; and further splitting at least one of the plurality of intermediate regions — 302

The electronic device obtains metadata of the two-dimensional panoramic projection image, where the metadata includes metadata information elements separately corresponding to the plurality of regions of the two-dimensional panoramic projection image, and a metadata information element corresponding to one region includes dynamic mapping information of the region — 303

The electronic device determines dynamic mapping information of each pixel in a current angle of view range based on respective dynamic mapping information of the plurality of regions — 304

The electronic device performs dynamic range mapping on each pixel in the current angle of view range based on the dynamic mapping information of each pixel in the current angle of view range, to obtain a two-dimensional panoramic projection image in the current angle of view range, where the two-dimensional panoramic projection image in the current angle of view range is used for display or subsequent processing — 305

FIG. 9

| 4 | 0 | 5 |
|---|---|---|
| 3 | 1 | 2 |

| a | b | c |
|---|---|---|
| d | e | f |

| A | B | C |
|---|---|---|
| D | E | F |
| G | H | I |
| J | K | L |

FIG. 10

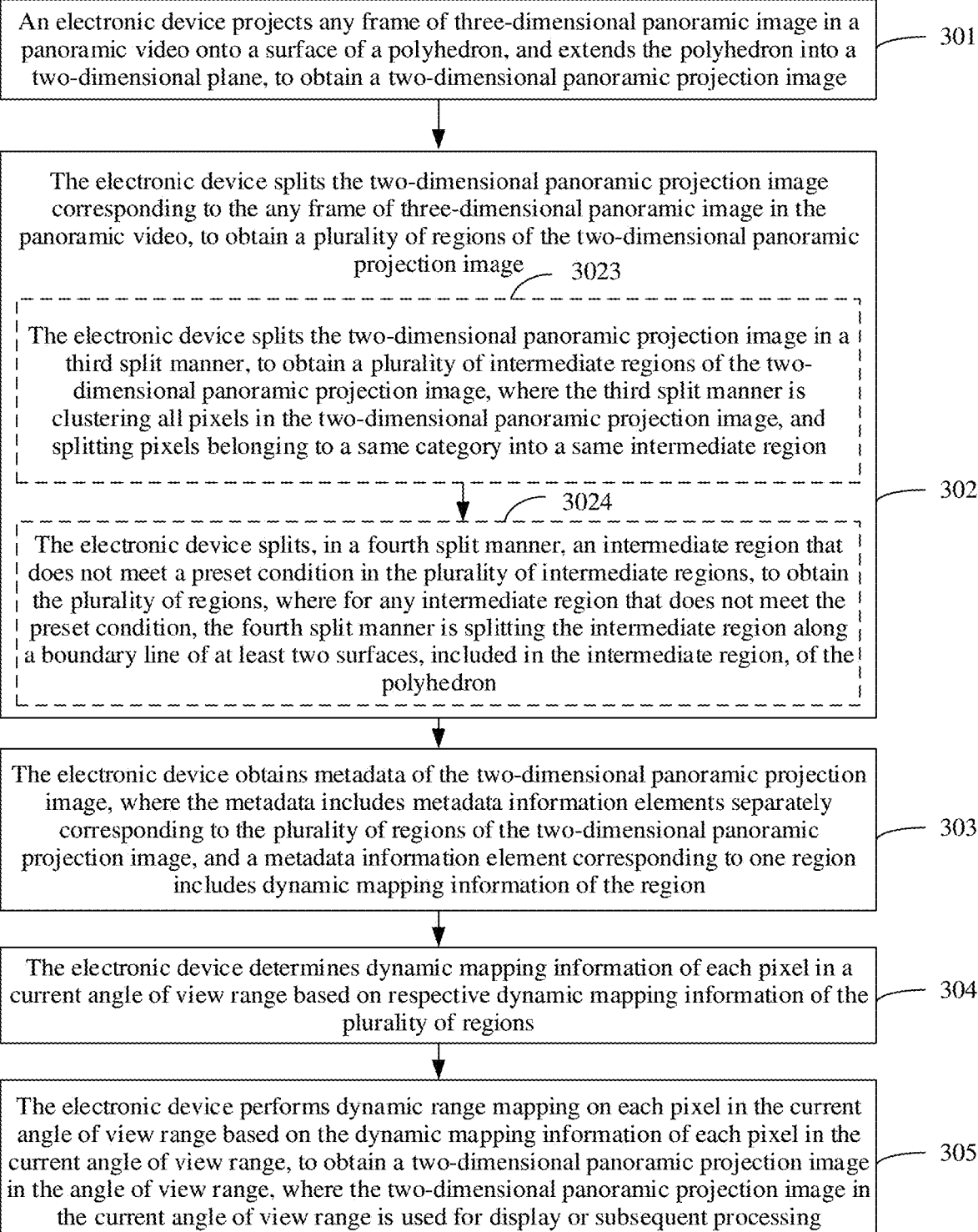

An electronic device projects any frame of three-dimensional panoramic image in a panoramic video onto a surface of a polyhedron, and extends the polyhedron into a two-dimensional plane, to obtain a two-dimensional panoramic projection image ⟋ 301

The electronic device splits the two-dimensional panoramic projection image corresponding to the any frame of three-dimensional panoramic image in the panoramic video, to obtain a plurality of regions of the two-dimensional panoramic projection image ⟋ 3023

The electronic device splits the two-dimensional panoramic projection image in a third split manner, to obtain a plurality of intermediate regions of the two-dimensional panoramic projection image, where the third split manner is clustering all pixels in the two-dimensional panoramic projection image, and splitting pixels belonging to a same category into a same intermediate region

⟋ 3024

The electronic device splits, in a fourth split manner, an intermediate region that does not meet a preset condition in the plurality of intermediate regions, to obtain the plurality of regions, where for any intermediate region that does not meet the preset condition, the fourth split manner is splitting the intermediate region along a boundary line of at least two surfaces, included in the intermediate region, of the polyhedron

⟋ 302

The electronic device obtains metadata of the two-dimensional panoramic projection image, where the metadata includes metadata information elements separately corresponding to the plurality of regions of the two-dimensional panoramic projection image, and a metadata information element corresponding to one region includes dynamic mapping information of the region ⟋ 303

The electronic device determines dynamic mapping information of each pixel in a current angle of view range based on respective dynamic mapping information of the plurality of regions ⟋ 304

The electronic device performs dynamic range mapping on each pixel in the current angle of view range based on the dynamic mapping information of each pixel in the current angle of view range, to obtain a two-dimensional panoramic projection image in the angle of view range, where the two-dimensional panoramic projection image in the current angle of view range is used for display or subsequent processing ⟋ 305

FIG. 11

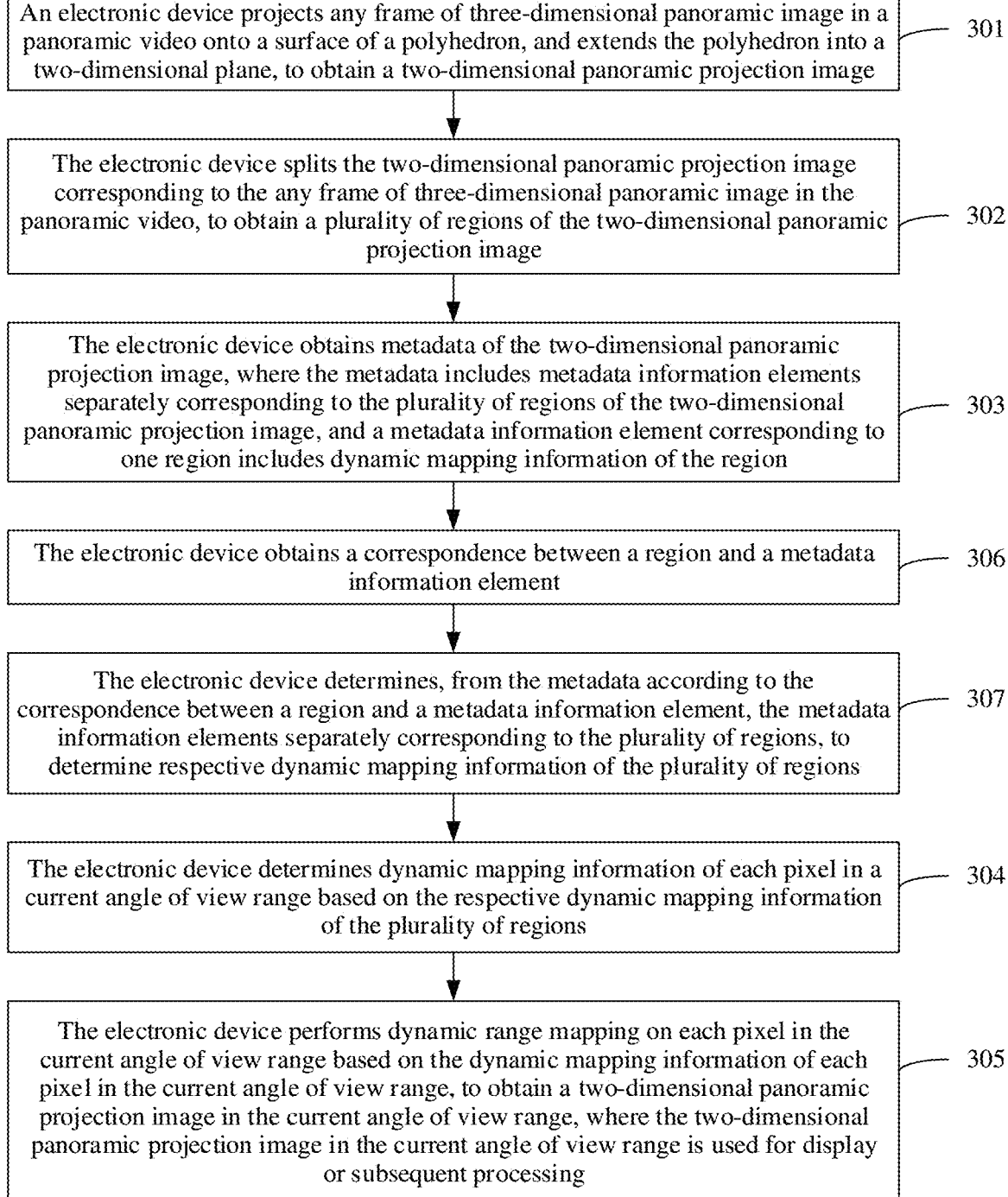

An electronic device projects any frame of three-dimensional panoramic image in a panoramic video onto a surface of a polyhedron, and extends the polyhedron into a two-dimensional plane, to obtain a two-dimensional panoramic projection image — 301

The electronic device splits the two-dimensional panoramic projection image corresponding to the any frame of three-dimensional panoramic image in the panoramic video, to obtain a plurality of regions of the two-dimensional panoramic projection image — 302

The electronic device obtains metadata of the two-dimensional panoramic projection image, where the metadata includes metadata information elements separately corresponding to the plurality of regions of the two-dimensional panoramic projection image, and a metadata information element corresponding to one region includes dynamic mapping information of the region — 303

The electronic device obtains a correspondence between a region and a metadata information element — 306

The electronic device determines, from the metadata according to the correspondence between a region and a metadata information element, the metadata information elements separately corresponding to the plurality of regions, to determine respective dynamic mapping information of the plurality of regions — 307

The electronic device determines dynamic mapping information of each pixel in a current angle of view range based on the respective dynamic mapping information of the plurality of regions — 304

The electronic device performs dynamic range mapping on each pixel in the current angle of view range based on the dynamic mapping information of each pixel in the current angle of view range, to obtain a two-dimensional panoramic projection image in the current angle of view range, where the two-dimensional panoramic projection image in the current angle of view range is used for display or subsequent processing — 305

FIG. 13

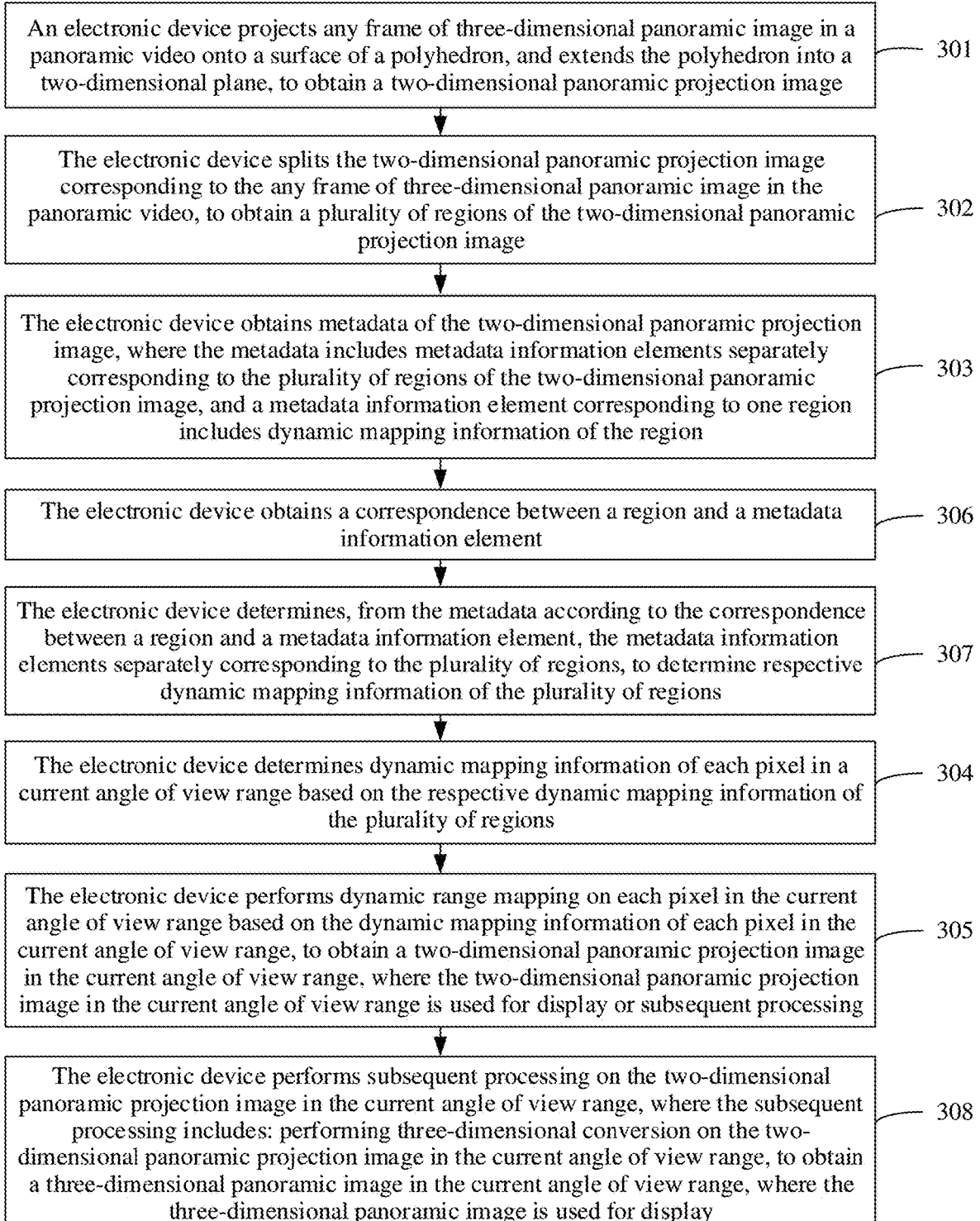

An electronic device projects any frame of three-dimensional panoramic image in a panoramic video onto a surface of a polyhedron, and extends the polyhedron into a two-dimensional plane, to obtain a two-dimensional panoramic projection image — 301

The electronic device splits the two-dimensional panoramic projection image corresponding to the any frame of three-dimensional panoramic image in the panoramic video, to obtain a plurality of regions of the two-dimensional panoramic projection image — 302

The electronic device obtains metadata of the two-dimensional panoramic projection image, where the metadata includes metadata information elements separately corresponding to the plurality of regions of the two-dimensional panoramic projection image, and a metadata information element corresponding to one region includes dynamic mapping information of the region — 303

The electronic device obtains a correspondence between a region and a metadata information element — 306

The electronic device determines, from the metadata according to the correspondence between a region and a metadata information element, the metadata information elements separately corresponding to the plurality of regions, to determine respective dynamic mapping information of the plurality of regions — 307

The electronic device determines dynamic mapping information of each pixel in a current angle of view range based on the respective dynamic mapping information of the plurality of regions — 304

The electronic device performs dynamic range mapping on each pixel in the current angle of view range based on the dynamic mapping information of each pixel in the current angle of view range, to obtain a two-dimensional panoramic projection image in the current angle of view range, where the two-dimensional panoramic projection image in the current angle of view range is used for display or subsequent processing — 305

The electronic device performs subsequent processing on the two-dimensional panoramic projection image in the current angle of view range, where the subsequent processing includes: performing three-dimensional conversion on the two-dimensional panoramic projection image in the current angle of view range, to obtain a three-dimensional panoramic image in the current angle of view range, where the three-dimensional panoramic image is used for display — 308

FIG. 14

DYNAMIC RANGE MAPPING METHOD AND APPARATUS FOR PANORAMIC VIDEO

CROSS-REFERENCE TO RELATED APPLICATIONS

This application is a continuation of International Application No. PCT/CN2022/133506, filed on Nov. 22, 2022, which claims priority to Chinese Patent Application No. 202111555880.5, filed on Dec. 17, 2021. The disclosures of the aforementioned applications are hereby incorporated by reference in their entireties.

TECHNICAL FIELD

Embodiments of the present disclosure relate to the field of video image processing, and in particular, to a dynamic range mapping method and apparatus for a panoramic video.

BACKGROUND

In the field of video/image processing, a dynamic range is a ratio of a maximum grayscale value (which is also referred to as a luminance value) of a pixel of an image to a minimum grayscale value of a pixel of the image.

After capturing a video/image, an electronic device may display the video/image, or transmit the video/image to another display device for display. Usually, dynamic ranges of pixels that can be displayed by different display devices are different. When the display device displays a video/image, a dynamic range of the captured video/image may be different from a dynamic range supported by the display device. Therefore, the dynamic range of the captured video/image needs to be adjusted to the dynamic range supported by the display device, to smoothly display the video/image on the display device. The foregoing process of adjusting the dynamic range of the video/image is dynamic range mapping.

Currently, for a two-dimensional video/image (namely, a captured video/image), there are a plurality of mature dynamic range mapping methods. However, with development of technologies, a three-dimensional video/image (for example, a panoramic video) becomes increasingly popular, and for the three-dimensional video/image, there is no effective dynamic range mapping technology.

SUMMARY

Embodiments of the present disclosure provide a dynamic range mapping method and apparatus for a panoramic video, to effectively implement dynamic range mapping on the panoramic video, thereby improving display effect of the panoramic video.

To achieve the foregoing objectives, the following technical solutions are used in embodiments of the present disclosure.

According to a first aspect, an embodiment of the present disclosure provides a dynamic range mapping method for a panoramic video, and the method is applied to an electronic device. The method includes: The electronic device splits a two-dimensional panoramic projection image, to obtain a plurality of regions of the two-dimensional panoramic projection image. The two-dimensional panoramic projection image is a two-dimensional panoramic projection image corresponding to any frame of three-dimensional panoramic image in a panoramic video, each of the plurality of regions meets a preset condition, and the preset condition includes at least one of the following conditions: pixels that are adjacent in the two-dimensional panoramic projection image and that are not adjacent in the three-dimensional panoramic image are not located in a same region, and pixels that are not adjacent in the three-dimensional panoramic image are not located in a same region. The pixel points that are adjacent in the two-dimensional panoramic projection image include pixels on at least two adjacent projection planes of the three-dimensional panoramic image, and the pixels that are not adjacent in the three-dimensional panoramic image include pixels that are in the three-dimensional panoramic image and that correspond to at least two non-adjacent projection planes. Then, the electronic device obtains metadata of the two-dimensional panoramic projection image. The metadata includes metadata information elements separately corresponding to the plurality of regions of the two-dimensional panoramic projection image, and a metadata information element corresponding to one region includes dynamic mapping information of the region. The electronic device determines dynamic mapping information of each pixel in a current angle of view range based on respective dynamic mapping information of the plurality of regions, and performs dynamic range mapping on each pixel in the current angle of view range based on the dynamic mapping information of each pixel in the current angle of view range, to obtain a two-dimensional panoramic projection image in the current angle of view range. The two-dimensional panoramic projection image in the current angle of view range is used for display or subsequent processing.

In this embodiment, in a process of splitting the two-dimensional panoramic projection image, when each region obtained through splitting meets the preset condition, it can be ensured that pixels with similar luminance (similar luminance indicates similar dynamic ranges) are split into a same region, and pixels that differ greatly in luminance (a large luminance difference indicates a large dynamic range difference) are not split into a same region. In a three-dimensional panoramic projection image, a pixel 1 may be a pixel of the sky, and a pixel 2 may be a pixel of the ground. Because luminance of the pixel of the sky differs greatly from luminance of the pixel of the ground, the pixel 1 and the pixel 2 are not located in a same region in the process of splitting the two-dimensional panoramic projection image. Because dynamic ranges of pixels in a same region are similar, dynamic range mapping may be performed on the pixels in the same region based on same dynamic range mapping information. Because dynamic ranges of pixels in different regions may differ greatly, dynamic range mapping may be performed on the pixels in different regions based on different dynamic range mapping information. Therefore, after the two-dimensional panoramic projection image is split into the plurality of regions in this split manner, the subsequent processing (namely, dynamic range mapping) is performed on each region. A feature of the pixel in each region may be adaptively adapted for process, to improve processing effect.

In this embodiment, with reference to a feature that a dynamic range of a panoramic video is large, the electronic device splits the two-dimensional panoramic projection image corresponding to the three-dimensional panoramic image, to obtain the regions, and performs dynamic range mapping on different regions. This can effectively implement dynamic range mapping on the panoramic video, thereby improving display effect of the panoramic video.

In a possible implementation, the dynamic range mapping method for a panoramic video provided in this embodiment further includes: projecting the three-dimensional panoramic image onto a surface of a polyhedron, and extending the polyhedron into a two-dimensional plane, to obtain the two-dimensional panoramic projection image, where the polyhedron includes at least one of the following: a regular tetrahedron, a regular hexahedron, a regular octahedron, a regular dodecahedron, or a regular icosahedron.

In this embodiment, the process of projecting the three-dimensional panoramic image into the two-dimensional panoramic projection image by using the polyhedron includes: placing, in the polyhedron, a sphere that can express the three-dimensional panoramic image (the three-dimensional panoramic image is expressed by a three-dimensional sphere), so that the sphere becomes an inscribed sphere of the polyhedron (it should be understood that a center of the polyhedron coincides with a spherical center of the sphere); and connecting the spherical center to any point (pixel point) on a spherical surface, and extending a connection line to intersect with a surface of the polyhedron, where a point obtained by projecting the point on the spherical surface onto a surface of the polyhedron is an intersection point of an extension line of the connection line that connects the spherical center to the point on the spherical surface and the surface of the polyhedron; or connecting a point on a surface of the polyhedron to the spherical center, where a connection line intersects with the spherical surface at a point, and the intersection point on the spherical surface and the point on the polyhedron are in a mutual projection relationship. It should be understood that a pixel value of the point on the spherical surface is a pixel value of the intersection point on the surface of the polyhedron. In this way, in the foregoing projection process, all pixels on the three-dimensional spherical surface are projected, to obtain projected pixels on each surface of the polyhedron (interpolation is performed on projected pixels on the two-dimensional plane based on different cases). Finally, the polyhedron is extended into the two-dimensional plane according to a specific rule, to obtain the two-dimensional panoramic projection image.

The two-dimensional panoramic projection image obtained by extending the polyhedron into the two-dimensional plane may be an irregular projection image. In a subsequent processing process, optionally, the irregular projection image may be directly processed, or the irregular image may be converted into a regular image for processing. In an implementation, a rectangular region that encloses the irregular image and that has a minimum area may be processed, and another region other than the projection region in the rectangular region may be filled, for example, filled with a preset pixel value. In another implementation, surface images in the irregular projection image may be spliced into a projection image in a regular shape (for example, a rectangle). In this way, pixel filling does not need to be performed.

In this embodiment, the polyhedron is not limited to a regular polyhedron. In other words, the two-dimensional panoramic projection diagram of the three-dimensional panoramic image may include several polygons of different sizes.

In a possible implementation, the splitting a two-dimensional panoramic projection image, to obtain a plurality of regions of the two-dimensional panoramic projection image specifically includes: splitting the two-dimensional panoramic projection image in a first split manner, to obtain the plurality of regions of the two-dimensional panoramic projection image, where the first split manner is splitting pixels, in the two-dimensional panoramic projection image, belonging to a same surface of the polyhedron into a region.

For example, the polyhedron used for projection is a regular hexahedron. After the three-dimensional panoramic projection image is projected by using the regular hexahedron, an obtained two-dimensional panoramic projection image includes six projection planes. The first split manner is splitting pixels, in the two-dimensional panoramic projection image, belonging to a same surface of the polyhedron into a region, that is, each projection plane of the two-dimensional panoramic projection image is used as a region. For example, the two-dimensional panoramic projection image may be split into six regions in the first split manner, which are respectively a region A, a region B, a region C, a region D, a region E, and a region F in FIG. 8. Each of the plurality of regions obtained by splitting the two-dimensional panoramic projection image in the first split manner meets the preset condition (including a condition 1 or a condition 2), that is, pixels that are adjacent in the two-dimensional panoramic projection image and that are not adjacent in the three-dimensional panoramic image are not located in a same region.

In a possible implementation, the splitting a two-dimensional panoramic projection image, to obtain a plurality of regions of the two-dimensional panoramic projection image specifically includes: splitting the two-dimensional panoramic projection image in a second split manner, to obtain the plurality of regions of the two-dimensional panoramic projection image, where the second split manner is splitting pixels, in the two-dimensional panoramic projection image, belonging to a same surface of the polyhedron into a region, to obtain a plurality of intermediate regions, and further splitting at least one of the plurality of intermediate regions.

For example, the polyhedron used for projection is still a regular hexahedron. After the three-dimensional panoramic projection image is projected by using the regular hexahedron, an obtained two-dimensional panoramic projection image includes six projection planes. The second split manner is splitting pixels, in the two-dimensional panoramic projection image, belonging to a same surface of the polyhedron into a region, to obtain a plurality of intermediate regions, and further splitting at least one of the plurality of intermediate regions. In other words, the two-dimensional panoramic projection image is first split in the first split manner, to obtain the plurality of regions as the plurality of intermediate regions; and then one or more of the plurality of intermediate regions are split, to obtain the plurality of regions as a final split result. Each of the plurality of regions obtained by splitting the two-dimensional panoramic projection image in the second split manner meets the preset condition (including a condition 1 or a condition 2), that is, pixels that are adjacent in the two-dimensional panoramic projection image and that are not adjacent in the three-dimensional panoramic image are not located in a same region.

In a possible implementation, the splitting a two-dimensional panoramic projection image, to obtain a plurality of regions of the two-dimensional panoramic projection image specifically includes: splitting the two-dimensional panoramic projection image in a third split manner, to obtain a plurality of intermediate regions of the two-dimensional panoramic projection image, where the third split manner is clustering all pixels in the two-dimensional panoramic projection image, and splitting pixels belonging to a same category into a same intermediate region; and splitting, in a fourth split manner, an intermediate region that does not meet the preset condition in the plurality of intermediate regions, to obtain the plurality of regions, where for any intermediate region that does not meet the preset condition, the fourth split manner is splitting the intermediate region along a boundary line of at least two surfaces, included in the intermediate region, of the polyhedron.

In this embodiment, a process of clustering all pixels in the two-dimensional panoramic projection image in the third split manner includes:

A clustering center is first determined, where the clustering center is one pixel. Optionally, the two-dimensional panoramic projection image may be first split into a plurality of regions in a preset split manner, a pixel value of a central location of each region is determined, and the pixel value of the central location of each region is used as the clustering center. For example, it is assumed that the two-dimensional panoramic projection image is an image obtained through projection by using a regular hexahedron. If the two-dimensional panoramic projection image is split into six regions, the two-dimensional panoramic projection image may be split into six regions in the first split manner, and a pixel value of a central location of each region is determined, to obtain six clustering centers. If the two-dimensional panoramic projection image is split into 12 regions, the two-dimensional panoramic projection image may be split into 12 regions in the second split manner, and a pixel value of a central location of each region is determined, to obtain 12 clustering centers.

Then, calculation is performed, according to a preset clustering algorithm and the determined clustering center, on distances (the distance is calculated based on coordinates of a pixel and coordinates of a pixel corresponding to the clustering center) between all pixel points and each clustering center, where the distance may be denoted as Di. Then, calculation is performed on differences between luminance values of all pixel points and luminance values of pixel points corresponding to clustering centers (calculation is performed on differences between luminance values of all pixel points and an average luminance value of pixel points of a category (namely, a category obtained through splitting in the preset split manner) corresponding to each clustering center; calculation is performed on differences between color values of all pixel points and color values of pixel points corresponding to clustering centers; or calculation is performed on differences between color values of all pixel points and an average color value of pixel points of a category (namely, a category obtained through splitting in the preset split manner) corresponding to each clustering center), where the difference is denoted as Ei. Each pixel is split into a category corresponding to a corresponding clustering center based on a weighted value of the distance Di and Ei, to obtain a clustering result. A category with a minimum weighted value is a category corresponding to the pixel, and pixel points of each category in the clustering result form a region.

Optionally, splitting the two-dimensional panoramic projection image according to the foregoing clustering method cannot ensure whether the plurality of obtained intermediate regions meet the preset condition (including the condition 1 or the condition 2). Therefore, the plurality of intermediate regions obtained through clustering need to be determined, to determine whether the plurality of intermediate regions meet the preset condition. If the plurality of intermediate regions all meet the preset condition, the plurality of intermediate regions are used as the final split result, that is, the plurality of intermediate regions are used as the plurality of regions obtained by splitting the two-dimensional panoramic projection image. If there is an intermediate region that does not meet the preset condition in the plurality of intermediate regions, the electronic device continues to split, in the fourth split manner, the intermediate region that does not meet the preset condition in the plurality of intermediate regions, to obtain the plurality of regions.

In a possible implementation, the first split manner, the second split manner, or the third split manner is preset (for example, preset according to a protocol) in the electronic device.

In a possible implementation, the metadata of the two-dimensional panoramic projection image further includes split manner indication information. The split manner indication information indicates that a split manner of the two-dimensional panoramic projection image is the first split manner, the second split manner, or the third split manner, that is, the split manner indication information may be transmitted in a bitstream. After determining a split manner of the two-dimensional panoramic projection image, a generation end adds, to the bitstream, indication information (namely, the split manner indication information) indicating the split manner. Therefore, after receiving the bitstream, a display end may learn of the split manner of the two-dimensional panoramic projection image based on the split manner indication information in the bitstream.

It may be understood that the first split manner is related to the second split manner, and a split result of the second split manner is a re-split result based on the first split manner.

In an implementation, if candidate split manners of the two-dimensional panoramic projection image include the first split manner and the second split manner, whether further splitting needs to be performed after splitting in the first splitting manner may be determined based on content of the two-dimensional panoramic projection image, that is, determining to use the first splitting manner or the second splitting manner.

Specifically, whether the split result of the first split manner further needs to be split may be determined based on the following process: first splitting the two-dimensional panoramic projection image in the first split manner, to obtain a plurality of intermediate regions; for each of the plurality of intermediate regions, calculating a histogram of the intermediate region, splitting the intermediate region into a plurality of regions, calculating a histogram of each region, and calculating a sum of difference values between histograms of the intermediate regions and histograms of regions obtained by splitting the intermediate region; determining whether the sum of the difference values is greater than a preset threshold; and if the sum of the difference values is greater than the preset threshold, further splitting the intermediate region, that is, using the second split manner to split the two-dimensional panoramic projection image. If the sum of the difference values is less than or equal to the preset threshold, the intermediate region does not need to be further split, that is, the two-dimensional panoramic projection image is split in the first split manner. It should be understood that, when the sum of the difference values is greater than the preset threshold, it indicates that a luminance difference between parts in the intermediate region is large, and further splitting needs to be performed.

Optionally, in some cases, if a default split manner is the first split manner, a related identifier may be used in the bitstream to indicate whether further splitting is performed. When the identifier indicates that no further splitting is performed, the split result obtained in the first split manner is a final result. When the identifier indicates that further splitting needs to be performed, the split result of the first split manner is further split.

In another implementation, if candidate split manners of the two-dimensional panoramic projection image include the first split manner, the second split manner, and the third split manner, which split manner is used may be determined by performing the following process: first splitting the two-dimensional panoramic projection image in the first split manner, the second split manner, and the third split manner; separately calculating histograms of regions obtained in the first split manner, the second split manner, and the third split manner, and a histogram of the two-dimensional panoramic projection image; calculating sums of difference values between histograms of a plurality of regions obtained in the split manners and the histogram of the two-dimensional panoramic projection image; and determining a split manner with a maximum sum of difference values between histograms as a final split manner. It should be understood that a larger sum of difference values between histograms indicates a larger luminance difference between regions obtained through splitting, and indicates that splitting is proper.

Optionally, sizes of metadata in the three split manners may be further calculated, and the metadata includes dynamic mapping information corresponding to each region of the two-dimensional panoramic projection image. Then, which split manner is used is determined based on a weighted value between a sum of difference values of histograms corresponding to the split manner and a size of the metadata corresponding to the split manner.

In a possible implementation, before the determining dynamic mapping information of each pixel in a current region based on respective dynamic mapping information of the plurality of regions, the dynamic range mapping method for a panoramic video provided in this embodiment further includes: obtaining a correspondence between a region and a metadata information element; and determining, from the metadata according to the correspondence between a region and a metadata information element, the metadata information elements separately corresponding to the plurality of regions, to determine the respective dynamic mapping information of the plurality of regions.

It may be understood that, in this embodiment, an idea of performing dynamic range mapping on the panoramic video is to project all three-dimensional panoramic images included in the panoramic video onto a two-dimensional plane, perform dynamic range mapping on an obtained two-dimensional panoramic projection image, and convert the two-dimensional panoramic projection image obtained through dynamic range mapping into a three-dimensional panoramic image, to obtain a panoramic video obtained through dynamic range mapping. In other words, the obtained metadata of the two-dimensional panoramic projection image is used to perform dynamic range mapping on the three-dimensional panoramic image (that is, used to perform dynamic range mapping on the panoramic video), and the metadata of the two-dimensional panoramic projection image may be considered as metadata of the three-dimensional panoramic image (or metadata of the panoramic video).

Optionally, the correspondence between a region and a metadata information element may be a one-to-one relationship, or may be a many-to-one relationship. In other words, one region of the two-dimensional panoramic projection image corresponds to one metadata information element, or the plurality of regions of the two-dimensional panoramic projection image correspond to one metadata information element. When a luminance difference between the plurality of regions of the two-dimensional panoramic projection image is large, and one type of dynamic mapping information is used for each region, the correspondence between a region and a metadata information element is a one-to-one relationship. When luminance of several regions in the plurality of regions is similar, the several regions may use a same type of dynamic mapping information, and the correspondence between a region and a metadata information element is a many-to-one relationship.

In this embodiment, a preset algorithm may also be used to determine whether the correspondence between the plurality of regions in the two-dimensional panoramic image and the metadata information elements is a one-to-one relationship or a many-to-one relationship. For example, whether to use a one-to-one or many-to-one correspondence may be determined by using the following method: The plurality of regions are clustered, where a quantity of clustered categories may be set based on a requirement. For example, the quantity of categories is set to a half of a quantity of regions or a quarter of a quantity of regions. For example, when a total quantity of regions is 8, eight regions may be split into two categories, or eight regions may be split into four categories, which is equivalent to obtaining four large regions. Then, a sum of differences between histograms of regions corresponding to the categories in the clustering result and a histogram of the two-dimensional panoramic projection image is calculated, and a sum of differences between histograms of the plurality of original regions and the histogram of the two-dimensional panoramic image is calculated. Finally, whether the correspondence between a plurality of regions and metadata information elements is a one-to-one relationship or a many-to-one relationship is determined based on the two sums of differences between histograms. For example, when two categories of regions are obtained by clustering the eight regions, the sum of the differences between the histograms of the regions corresponding to the categories in the clustering result and the histogram of the two-dimensional panoramic projection image is DiffHIS_X2, and the sum of the differences between the histograms of the plurality of original regions and the histogram of the two-dimensional panoramic image is denoted as DiffHIS_org. A determining method is as follows: If $DiffHIS\_org \times (1-T2) > DiffHIS\_X2$, the correspondence between regions and metadata information elements is a many-to-one relationship; or if $DiffHIS\_org \times (1-T2) \leq DiffHIS\_X2$, the correspondence between regions and metadata information elements is a one-to-one relationship, where T2 is the preset threshold.

In a possible implementation, the correspondence between a region and a metadata information element is a correspondence between an index of the metadata information element and an index of the region; or the correspondence between a region and a metadata information element is a correspondence between an index of the metadata element and coordinates of one or more pixels in the region.

In this embodiment, the correspondence between an index of the metadata information element and an index of the region is essentially a traversal order relationship. For example, for a two-dimensional panoramic projection image including six regions, the six regions form a 2×3 (that is, two rows, and each row includes three regions) rectangle, and are sequentially a region 4, a region 0, a region 5, a region 3, a region 1, and a region 2 from left to right and from top to bottom. Therefore, in a table of a correspondence between regions and metadata information elements, the six regions in the two-dimensional panoramic projection image are sequentially traversed from left to right and from top to bottom, and metadata information elements separately corresponding to the six regions may be sequentially determined in metadata. In an implementation, the traversal order of the plurality of regions may be indicated in a bitstream. For example, indication information indicating the traversal order may be carried in the metadata. The traversal order is not limited to the foregoing order from left to right and from top to bottom, and the traversal order is specifically related to a location of each region in the two-dimensional panoramic projection image.

Optionally, the traversal order of the plurality of regions may be a preset order. Alternatively, the generation end determines a traversal order from candidate traversal orders according to a related algorithm, adds an identifier to the metadata of the bitstream, and transfers the bitstream to generation end, to indicate the traversal order.

In this embodiment, which traversal order is used may be determined by using the following method: calculating a histogram of each of the plurality of regions; for each candidate traversal order, calculating a sum of differences between histograms of adjacent regions; and determining a traversal order with a minimum sum of differences between histograms in candidate traversal orders as a final traversal order.

In this embodiment, coordinates of the pixel of the region may also be carried in metadata. Specifically, the coordinates of the pixel of each region are carried in a metadata information element corresponding to each region. After splitting the two-dimensional panoramic projection image to obtain the plurality of regions, for one of the regions, the display end determines, according to the correspondence, a pixel corresponding to which coordinates belong to the region, and uses a metadata information element corresponding to the coordinate as a metadata information element of the region.

In a possible implementation, dynamic mapping information of a to-be-processed pixel in the current angle of view range is dynamic mapping information of a plurality of regions in a first preset range, and the first preset range is a range centered on the to-be-processed pixel (manner 1); dynamic mapping information of a to-be-processed pixel in the current angle of view range is dynamic mapping information of a region to which a pixel that corresponds to a viewpoint center of the current angle of view range and that is in the two-dimensional panoramic projection image belongs (manner 2); dynamic mapping information of a to-be-processed pixel in the current angle of view range is dynamic mapping information of a plurality of regions in a second preset range, and the second preset range is a range centered on a pixel that corresponds to a viewpoint center of the current angle of view range and that is in the two-dimensional panoramic projection image (manner 3); or dynamic mapping information of one pixel in the current region is dynamic mapping information of the current region (manner 4).

It should be understood that when a user watches the panoramic video, the user (head) cannot see all content of the panoramic video in a current posture, but can see only content of the video in a specific range. The range may be understood as an angle of view range of the user. It can be learned that the angle of view range of the user is related to a current viewing posture of the user. In this embodiment, performing dynamic range mapping on the panoramic video is performing dynamic range mapping on content in the angle of view range of the user currently watching the panoramic video. After obtaining the dynamic mapping information of the plurality of regions, the electronic device may determine dynamic mapping information of each pixel in the current angle of view range in any one of the four manners based on the dynamic mapping information of the plurality of regions.

Optionally, during actual application, the generation end may select a proper manner from the four manners based on an actual requirement to determine the dynamic mapping information of the to-be-processed pixel, and transfer the selected manner carried in (the metadata of) the bitstream to the display end. Alternatively, the generation end and the display end may pre-determine a manner to be used. This is not limited in this embodiment.

In a possible implementation, the dynamic mapping information in this embodiment is used to map a dynamic range of the pixel of the two-dimensional panoramic projection image from a first dynamic range to a second dynamic range; or the dynamic mapping information is used to map a dynamic range of the pixel of the two-dimensional panoramic projection image from a second dynamic range to a first dynamic range. The first dynamic range is larger than the second dynamic range, that is, dynamic range mapping performed on the pixel may be mapping from a high dynamic range to a low dynamic range or mapping from a low dynamic range to a high dynamic range.

Correspondingly, after the dynamic mapping information of each pixel in the current angle of view range is determined by using the method, a pixel may correspond to a plurality of pieces of dynamic mapping information (for example, corresponding to a plurality of dynamic mapping curves). After dynamic range mapping is performed on the pixel, one dynamic mapping result may be obtained for each piece of dynamic mapping information. In this case, a plurality of dynamic mapping results may be processed, to obtain a final dynamic mapping result. A processing manner may include any one of the following: using a median value of the plurality of dynamic mapping results as the final dynamic mapping result, or performing weighted averaging on the plurality of dynamic mapping results, to obtain the final dynamic mapping result.

In a possible implementation, the obtaining metadata of the two-dimensional panoramic projection image specifically includes: receiving the metadata of the two-dimensional panoramic projection image from another electronic device. Specifically, after generating the metadata, the generation end encodes the metadata into the bitstream and sends the bitstream to the display end, so that the display end receives the bitstream and parses the bitstream, to obtain the metadata.

In a possible implementation, the dynamic range mapping method for a panoramic video in this embodiment further includes: performing subsequent processing on the two-dimensional panoramic projection image in the current angle of view range, where the subsequent processing includes: performing three-dimensional conversion on the two-dimensional panoramic projection image in the current angle of view range, to obtain a three-dimensional panoramic image in the current angle of view range. The three-dimensional panoramic image is used for display.

The obtained two-dimensional panoramic projection image may be used for display. Further, the two-dimensional panoramic projection image is further used for the subsequent processing, for example, the two-dimensional panoramic projection image is converted into a three-dimensional panoramic image for display. Further, after all three-dimensional panoramic images of the panoramic video are obtained, the panoramic video may be played.

According to a second aspect, an embodiment of the present disclosure provides a dynamic range mapping apparatus for a panoramic video, including a split module, an obtaining module, a determining module, and a processing module. The split module is configured to split a two-dimensional panoramic projection image, to obtain a plurality of regions of the two-dimensional panoramic projection image. The two-dimensional panoramic projection image is a two-dimensional panoramic projection image corresponding to any frame of three-dimensional panoramic image in a panoramic video, each of the plurality of regions meets a preset condition, and the preset condition includes at least one of the following conditions: pixels that are adjacent in the two-dimensional panoramic projection image and that are not adjacent in the three-dimensional panoramic image are not located in a same region, and pixels that are not adjacent in the three-dimensional panoramic image are not located in a same region. The pixel points that are adjacent in the two-dimensional panoramic projection image include pixels on at least two adjacent projection planes of the three-dimensional panoramic image, and the pixels that are not adjacent in the three-dimensional panoramic image include pixels that are in the three-dimensional panoramic image and that correspond to at least two non-adjacent projection planes. The obtaining module is configured to obtain metadata of the two-dimensional panoramic projection image, where the metadata includes metadata information elements separately corresponding to the plurality of regions of the two-dimensional panoramic projection image, and a metadata information element corresponding to one region includes dynamic mapping information of the region. The determining module is configured to determine dynamic mapping information of each pixel in a current angle of view range based on respective dynamic mapping information of the plurality of regions. The processing module is configured to perform dynamic range mapping on each pixel in the current angle of view range based on the dynamic mapping information of each pixel in the current angle of view range, to obtain a two-dimensional panoramic projection image in the current angle of view range, where the two-dimensional panoramic projection image in the current angle of view range is used for display or subsequent processing.

In a possible implementation, the dynamic range mapping apparatus for a panoramic video provided in this embodiment further includes a conversion module. The conversion module is configured to project the three-dimensional panoramic image onto a surface of a polyhedron, and extend the polyhedron into a two-dimensional plane, to obtain the two-dimensional panoramic projection image. The polyhedron includes at least one of: a regular tetrahedron, a regular hexahedron, a regular octahedron, a regular dodecahedron, or a regular icosahedron.

In a possible implementation, the split module is specifically configured to split the two-dimensional panoramic projection image in a first split manner, to obtain the plurality of regions of the two-dimensional panoramic projection image, where the first split manner is splitting pixels, in the two-dimensional panoramic projection image, belonging to a same surface of the polyhedron into a region.

In a possible implementation, the split module is specifically configured to split the two-dimensional panoramic projection image in a second split manner, to obtain the plurality of regions of the two-dimensional panoramic projection image, where the second split manner is splitting pixels, in the two-dimensional panoramic projection image, belonging to a same surface of the polyhedron into a region, to obtain a plurality of intermediate regions, and further splitting at least one of the plurality of intermediate regions.

In a possible implementation, the split module is specifically configured to: split the two-dimensional panoramic projection image in a third split manner, to obtain a plurality of intermediate regions of the two-dimensional panoramic projection image, where the third split manner is clustering all pixels in the two-dimensional panoramic projection image, and splitting pixels belonging to a same category into a same intermediate region; and split, in a fourth split manner, an intermediate region that does not meet the preset condition in the plurality of intermediate regions, to obtain the plurality of regions, where for any intermediate region that does not meet the preset condition, the fourth split manner is splitting the intermediate region along a boundary line of at least two surfaces, included in the intermediate region, of the polyhedron.

In a possible implementation, the first split manner, the second split manner, or the third split manner is preset in an electronic device.

In a possible implementation, the metadata of the two-dimensional panoramic projection image further includes split manner indication information, where the split manner indication information indicates that a split manner of the two-dimensional panoramic projection image is the first split manner, the second split manner, or the third split manner.

In a possible implementation, the obtaining module is further configured to obtain a correspondence between a region and a metadata information element. The determining module is further configured to determine, from the metadata according to the correspondence between a region and a metadata information element, the metadata information elements separately corresponding to the plurality of regions, to determine the respective dynamic mapping information of the plurality of regions.

In a possible implementation, the correspondence between a region and a metadata information element is a correspondence between an index of the metadata information element and an index of the region; or the correspondence between a region and a metadata information element is a correspondence between an index of the metadata element and coordinates of one or more pixels in the region.

In a possible implementation, dynamic mapping information of a to-be-processed pixel in the current angle of view range is dynamic mapping information of a plurality of regions in a first preset range, and the first preset range is a range centered on the to-be-processed pixel; dynamic mapping information of a to-be-processed pixel in the current angle of view range is dynamic mapping information of a region to which a pixel that corresponds to a viewpoint center of the current angle of view range and that is in the two-dimensional panoramic projection image belongs; dynamic mapping information of a to-be-processed pixel in the current angle of view range is dynamic mapping information of a plurality of regions in a second preset range, and the second preset range is a range centered on a pixel that corresponds to a viewpoint center of the current angle of view range and that is in the two-dimensional panoramic projection image; or dynamic mapping information of one pixel in the current region is dynamic mapping information of the current region.

In a possible implementation, the dynamic mapping information in this embodiment is used to map a dynamic range of the pixel of the two-dimensional panoramic projection image from a first dynamic range to a second dynamic range; or the dynamic mapping information is used to map a dynamic range of the pixel of the two-dimensional panoramic projection image from a second dynamic range to a first dynamic range. The first dynamic range is larger than the second dynamic range.

In a possible implementation, the obtaining module is specifically configured to receive the metadata of the two-dimensional panoramic projection image from another electronic device.

In a possible implementation, the conversion module is further configured to perform subsequent processing on the two-dimensional panoramic projection image in the current angle of view range, where the subsequent processing includes: performing three-dimensional conversion on the two-dimensional panoramic projection image in the current angle of view range, to obtain a three-dimensional panoramic image in the current angle of view range. The three-dimensional panoramic image is used for display.

According to a third aspect, an embodiment of the present disclosure provides an electronic device, including a memory and at least one processor connected to the memory. The memory is configured to store instructions, and after the instructions are read by the at least one processor, the method in any one of the first aspect and the possible implementations of the first aspect is performed.

According to a fourth aspect, an embodiment of the present disclosure provides a computer-readable storage medium, storing a computer program. When the computer program is executed by a processor, the method in any one of the first aspect and the possible implementations of the first aspect is implemented.

According to a fifth aspect, an embodiment of the present disclosure provides a computer program product. The computer program product includes instructions, and when the computer program product runs on a computer, the method in any one of the first aspect and the possible implementations of the first aspect is performed.

According to a sixth aspect, an embodiment of the present disclosure provides a chip, including a memory and a processor. The memory is configured to store computer instructions. The processor is configured to invoke the computer instructions from the memory and run the computer instructions, to perform the method in any one of the first aspect and the possible implementations of the first aspect.

It should be understood that, for beneficial effect achieved by the technical solutions in the second aspect to the sixth aspect and the corresponding possible implementations in embodiments of the present disclosure, refer to the foregoing technical effect in the first aspect and the corresponding possible implementations. Details are not described herein again.

BRIEF DESCRIPTION OF DRAWINGS

FIG. 3 is a diagram 1 of an example dynamic range mapping method for a panoramic video according to an embodiment of the present disclosure;

FIG. 7 is a diagram 2 of an example dynamic range mapping method for a panoramic video according to an embodiment of the present disclosure;

FIG. 8 is a diagram 1 of a split result of an example two-dimensional panoramic projection image according to an embodiment of the present disclosure;

FIG. 9 is a diagram 3 of an example dynamic range mapping method for a panoramic video according to an embodiment of the present disclosure;

FIG. 10 is a diagram 2 of a split result of an example two-dimensional panoramic projection image according to an embodiment of the present disclosure;

FIG. 11 is a diagram 4 of an example dynamic range mapping method for a panoramic video according to an embodiment of the present disclosure;

FIG. 13 is a diagram 5 of an example dynamic range mapping method for a panoramic video according to an embodiment of the present disclosure;

FIG. 14 is a diagram 6 of an example dynamic range mapping method for a panoramic video according to an embodiment of the present disclosure;

DESCRIPTION OF EMBODIMENTS

Figure 1:
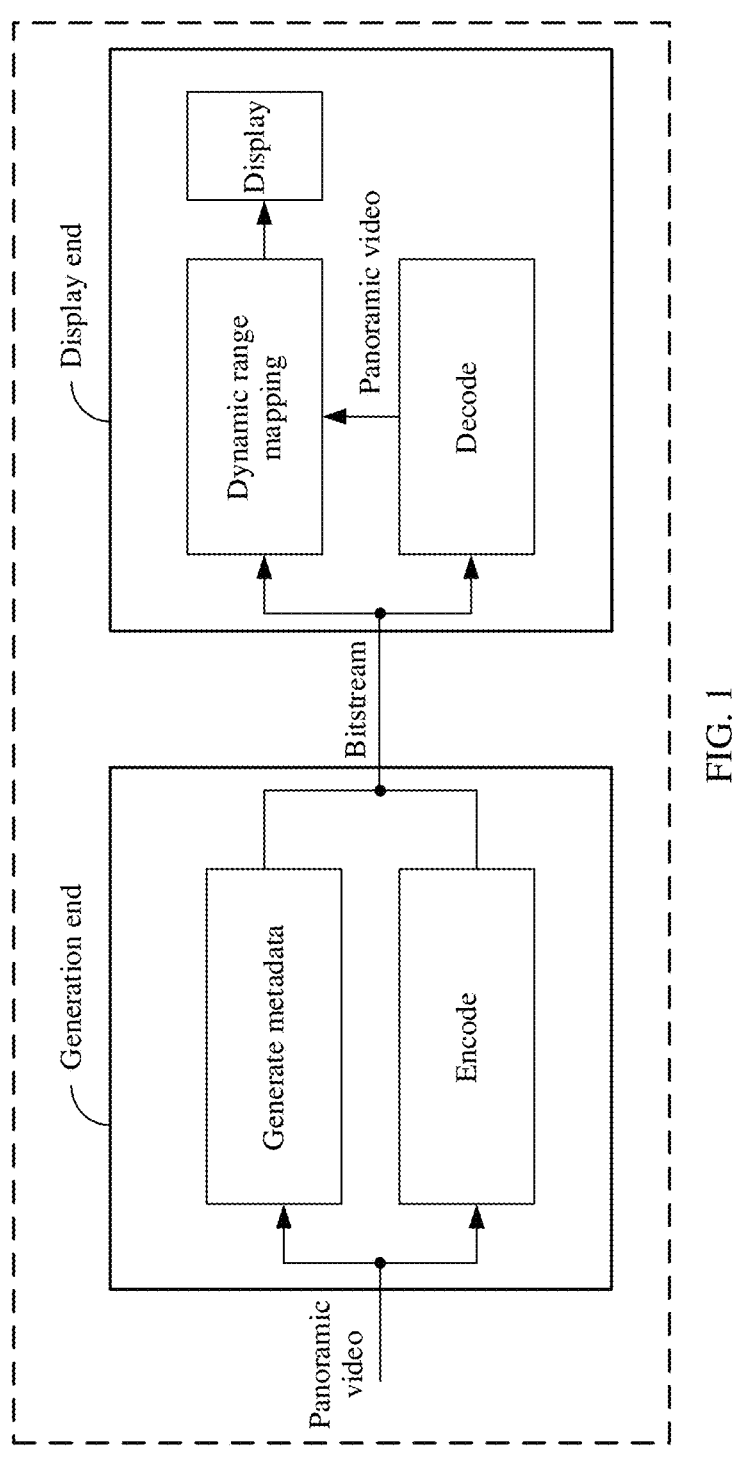
FIG. 1 is a diagram of a framework of an example video processing process according to an embodiment of the present disclosure.

The term "and/or" in this specification describes only an association relationship for describing associated objects and represents that three relationships may exist. For example, A and/or B may represent any of the following three cases: Only A exists, both A and B exist, and only B exists.

In the specification and claims in embodiments of the present disclosure, the terms "first", "second", and so on are intended to distinguish between different objects but do not indicate a particular order of the objects. For example, a first split manner, a second split manner, and the like are used to distinguish between different split manners, but are not used to describe a specific order of the split manners.

In embodiments of the present disclosure, a word like "example" or "for example" is used to give an example, an illustration, or a description. Any embodiment or design scheme described as an "example" or "for example" in embodiments of the present disclosure should not be explained as being more preferred or having more advantages than another embodiment or design scheme. To be precise, the word "example", "for example", or the like is intended to present a related concept in a specific manner.

In descriptions of embodiments of the present disclosure, unless otherwise stated, "a plurality of" means two or more than two. For example, a plurality of regions means two or more regions.

The following first describes some concepts related to a dynamic range mapping method and apparatus for a panoramic video provided in embodiments of the present disclosure.

Dynamic range: In most fields, the dynamic range indicates a ratio of a maximum value to a minimum value of a variable. In the digital image field, the dynamic range indicates a ratio of a maximum grayscale value of a pixel of an image to a minimum grayscale value. The grayscale value may also be understood as a luminance value in a unit of nit or candela per square meter (cd/m$^2$), where 1 nit=1 cd/m$^2$.

Usually, a dynamic range of nature is large, luminance of a night scene under the stars is about 0.001 cd/m$^2$, and luminance of the sun may reach 10$^9$ cd/m$^2$. In this way, the dynamic range of nature is 10$^9$/0.001=10$^{12}$. In a scene of a real natural environment, because luminance of the sun and luminance of the stars cannot be obtained at the same time, a dynamic range of the scene of the real natural environment may not reach 10$^{12}$. For the scene of the real natural environment, the dynamic range is usually from 10$^{-3}$ to 10$^6$.

Dynamic range mapping: After a video/image is captured in the real natural environment, in a process of displaying the captured video/image on a display device (for example, a television or an iPad), because a dynamic range, supported by the display device, of the displayed video/image may be different from an original dynamic range of the video/image captured from the real natural environment, if the video/image is directly displayed based on the original dynamic range of the video/image, the display device cannot display the video/image. Therefore, the dynamic range of the captured video/image needs to be adapted to the display device, that is, the dynamic range of the captured video/image is adjusted to the dynamic range supported by the display device, to display the captured video/image on the display device. The foregoing process of adjusting the dynamic range of the video/image is dynamic range mapping (which may also be referred to as tone mapping, that is, tone-mapping).

It may be understood that the dynamic range is classified into a high dynamic range (HDR) or a low dynamic range, and the low dynamic range may also be referred to as a standard dynamic range (SDR). Usually, an image with a luminance range of 10$^{-3}$ to 10$^6$ is referred to as a high dynamic range image, and an image with a luminance range of 0 to 255 is referred to as a low dynamic range image. Currently, in most color digital images, one byte (namely, 8 bits) indicates a pixel of each of R, G, and B channels, that is, a luminance range of the pixel of each channel is from 0 to 255, and 0 to 255 is a standard dynamic range of the image.

In embodiments of the present disclosure, the dynamic range mapping includes high-to-low dynamic range mapping and low-to-high dynamic range mapping. It should be noted that high and low herein are relative concepts, and are different from the foregoing concepts of the high dynamic range and the low dynamic range. For example, a dynamic range is mapped from a dynamic range 1 to a dynamic range 2. A relationship between the dynamic range 1 and the dynamic range 2 may be that the dynamic range 1 is larger than the dynamic range 2, or the dynamic range 1 may be smaller than the dynamic range 2. However, both dynamic range 1 and the dynamic range 2 may be high dynamic ranges or low dynamic ranges.

For example, an original dynamic range of a captured video/image is an HDR of 1000, and the dynamic range supported by the display device is an SDR of 100. In this case, dynamic range mapping is mapping from a high dynamic range to a low dynamic range, a dynamic range before mapping is an HDR, and a dynamic range after mapping is an SDR. For another example, an original dynamic range of a captured video/image is an HDR of 4000, and the dynamic range supported by the display device is an HDR of 500. In this case, dynamic range mapping is also mapping from a high dynamic range to a low dynamic range, but both a dynamic range before mapping and a dynamic range after mapping are HDRs.

For example, an original dynamic range of a captured video/image is an SDR of 100, and the dynamic range supported by the display device is an HDR of 2000. In this case, the dynamic range mapping is mapping from a low dynamic range to a high dynamic range, a dynamic range before mapping is an SDR, and a dynamic range after mapping is an HDR. For another example, an original dynamic range of a captured video/image is an SDR of 100, and the dynamic range supported by the display device is an SDR of 200. In this case, dynamic range mapping is mapping from a low dynamic range to a high dynamic range, but both a dynamic range before mapping and a dynamic range after mapping are SDRs.

With reference to the foregoing examples, Table 1 shows several cases of dynamic range mapping.

TABLE 1

| Dynamic range before mapping | Dynamic range after mapping |
| --- | --- |
| HDR | SDR |
| HDR | HDR |
| SDR | HDR |
| SDR | SDR |

When dynamic range mapping is performed on a video/image, some dynamic range mapping models may be used to perform dynamic range mapping on pixels of the captured video/image. The dynamic range mapping models include but are not limited to a sigmoidal curve, a Bessel curve, and the like. It should be understood that the dynamic range mapping models are models for performing dynamic range mapping on a two-dimensional video/image.

Optionally, a method for performing dynamic range mapping on a video/image includes static dynamic range mapping and dynamic dynamic range mapping. The static dynamic range mapping is performing dynamic range mapping on a video/image by using a same dynamic range mapping curve for same video/image content (which may relate to video/image content of a plurality of scenes) or video/image content in a same hard disk. The dynamic dynamic range mapping is performing dynamic range mapping on a video/image by using different dynamic range mapping curves based on video/image content of different scenes or different frames.

Advantages of the static dynamic range mapping are a simple dynamic range mapping process, and little information carried for transmitting dynamic mapping information (for example, information including a dynamic range mapping curve). Disadvantages of the static dynamic range mapping are that a mapping result obtained by performing dynamic range mapping on the video/image by using a single dynamic range mapping curve may be defective, resulting in poor display effect of a video/image obtained through dynamic range mapping. For example, if the dynamic range mapping curve is mainly used to perform dynamic range mapping for high luminance, effect of performing dynamic range mapping on a bright region of an image by using the dynamic range mapping curve is good. However, for a dark region of the image, when the dynamic range mapping curve is used to perform dynamic range mapping, a pixel value of the dark region is excessively small, and consequently, some information (for example, detailed information) is lost in an image obtained through dynamic range mapping.

Advantages of the dynamic dynamic range mapping are that for different scenes or different frames, different dynamic range mapping curves suitable for different scenes or different frames are used to perform dynamic range mapping, and a mapping result is good, that is, display effect of a video/image obtained through dynamic range mapping is good. Disadvantages of the dynamic dynamic range mapping are a complex dynamic range mapping process, and much information carried for transmitting dynamic mapping information.

Panoramic video: The panoramic video is a video that includes content of a spherical surface scene in a horizontal 360-degree and vertical 180-degree range. The panoramic video includes a plurality of frames of three-dimensional (3D) panoramic images, and the three-dimensional panoramic image may be expressed by using a three-dimensional spherical surface. Therefore, the three-dimensional panoramic image of the panoramic video may also be referred to as a three-dimensional spherical surface representation panorama of the panoramic video.

Compared with a common two-dimensional video (covering a horizontal 33-degree and vertical 18-degree range), the panoramic video covers a larger range, to provide immersive visual experience for a user. The user watches a panoramic video by using a wearable auxiliary device (for example, VR glasses). Specifically, the head of the user is used as a center point, and the head may rotate horizontally by 360 degrees and vertically by 180 degrees. The user freely selects, by adjusting a horizontal angle and a vertical angle of viewing, a window in a specified direction to watch, where the window is an angle of view range of the user. It may be understood that, if the panoramic video is simulated as a spherical surface of a sphere, and the head of the user is located at a spherical center of the sphere, the window may be continuously adjusted by rotating the head and/or looking up/down, to view the complete panoramic video.

In embodiments of the present disclosure, because a luminance coverage range of the panoramic video is large, compared with a common two-dimensional video, the panoramic video has a larger dynamic range. Specifically, the two-dimensional video is obtained in a small range, and light conditions in the small range are similar, that is, a light change range is small, and a dynamic range is also small. The panoramic video is obtained in a large range, and a light change range is usually large in the large range. For example, a panoramic video obtained in the daytime may include a region of the sun in the sky, where the region is bright (that is, a luminance value is high); and may also include an internal region of a building or a shadow region, where the region is dark (that is, a luminance value is low). Therefore, a dynamic range of the panoramic video is large, which imposes a large challenge on description and display of the panoramic video.

Currently, a technology for performing dynamic range mapping on a two-dimensional video/image is mature. However, with emergence of a panoramic video, a related technology is urgently needed to implement dynamic range mapping on the panoramic video. In view of this, embodiments of the present disclosure provide a dynamic range mapping method and apparatus for a panoramic video. For any frame of three-dimensional panoramic image in the panoramic video, an electronic device performs dynamic range mapping on a two-dimensional panoramic projection image corresponding to the three-dimensional panoramic image, and converts a two-dimensional panoramic projection image obtained through dynamic range mapping into a three-dimensional panoramic image, to implement dynamic range mapping on the panoramic video.

A specific solution of embodiments of the present disclosure is as follows: The electronic device splits the two-dimensional panoramic projection image corresponding to the three-dimensional panoramic image, to obtain a plurality of regions of the two-dimensional panoramic projection image, where each of the plurality of regions meets a preset condition (the preset condition is described in detail in the following embodiments). The electronic device obtains metadata of the two-dimensional panoramic projection image, where the metadata includes metadata information elements separately corresponding to the plurality of regions of the two-dimensional panoramic projection image, and a metadata information element corresponding to one region includes dynamic mapping information of the region. Then, the electronic device determines dynamic mapping information of each pixel in a current angle of view range based on respective dynamic mapping information of the plurality of regions, and performs dynamic range mapping on each pixel in the current angle of view range based on the dynamic mapping information of each pixel in the current angle of view range (an angle of view range of a user that currently watches the panoramic video), to obtain a two-dimensional panoramic projection image in the current angle of view range, where the two-dimensional panoramic projection image in the current angle of view range is used for display or subsequent processing. In the dynamic range mapping method for a panoramic video provided in embodiments of the present disclosure, with reference to a feature that a dynamic range of a panoramic video is large, the electronic device splits the two-dimensional panoramic projection image corresponding to the three-dimensional panoramic image, to obtain the regions, and performs dynamic range mapping on different regions. This can effectively implement dynamic range mapping on the panoramic video, thereby improving display effect of the panoramic video.

It should be noted that, in embodiments of the present disclosure, a format of an image (which may be referred to as source data) included in the panoramic video is not limited, and the image may be in a YUV format, or may be in an RGB format. In addition, a bit width of the source data is not limited in embodiments of the present disclosure, and the bit width of the source data may be 8 bits, 10 bits, or 12 bits.

It may be understood that, for a panoramic video, usually, a processing process of the panoramic video mainly includes production, encoding, decoding, and display of the panoramic video. The production and encoding processes of the panoramic video may be completed at a front end (which may also be referred to as a generation end), and the decoding and display processes of the panoramic video may be completed at a back end (which may be referred to as a display end). Refer to FIG. 1. At the generation end, production of the panoramic video includes: performing simulated dynamic range mapping on each frame of three-dimensional panoramic image of the panoramic video; determining dynamic mapping information (for example, the dynamic mapping information includes information about a curve used for dynamic range mapping); and generating metadata including the dynamic mapping information. Encoding of the panoramic video includes encoding (for example, including prediction, transformation, quantization, and entropy encoding) of each frame of three-dimensional panoramic image in the panoramic video. For an image encoding process, refer to the conventional technology. A panoramic video encoding method is not limited in the present disclosure. The generation end further writes the generated metadata including the dynamic mapping information into a bitstream, and transmits the bitstream to the display end. At the display end, the bitstream is parsed to obtain the metadata and image decoding data (including a syntax element used for image decoding and image data), and the image data is decoded (for example, including prediction, dequantization, and inverse transformation) based on the syntax element used for image decoding, to obtain the three-dimensional panoramic image. For an image decoding process, refer to the conventional technology (a decoding method corresponds to an encoding method). A panoramic video decoding method is not limited in the present disclosure. Then, the three-dimensional panoramic image is converted into the two-dimensional panoramic projection image, and dynamic range mapping is performed on the two-dimensional panoramic projection image based on the metadata obtained by parsing the bitstream, to display a panoramic video obtained through dynamic range mapping.

In embodiments of the present disclosure, a dynamic range mapping process of a panoramic video is described from a perspective at the display end. For example, a product form of an electronic device used as the display end includes but is not limited to a virtual reality (VR) device (for example, VR glasses), a display device (for example, a mobile phone), a video application conversion device (for example, a transcoder), and a live streaming device. It should be understood that, on the VR glasses and the display device, dynamic range mapping is implemented based on a hardware chip, and on the live streaming device and the video conversion device, dynamic range mapping is implemented based on software program code.

Figure 2:
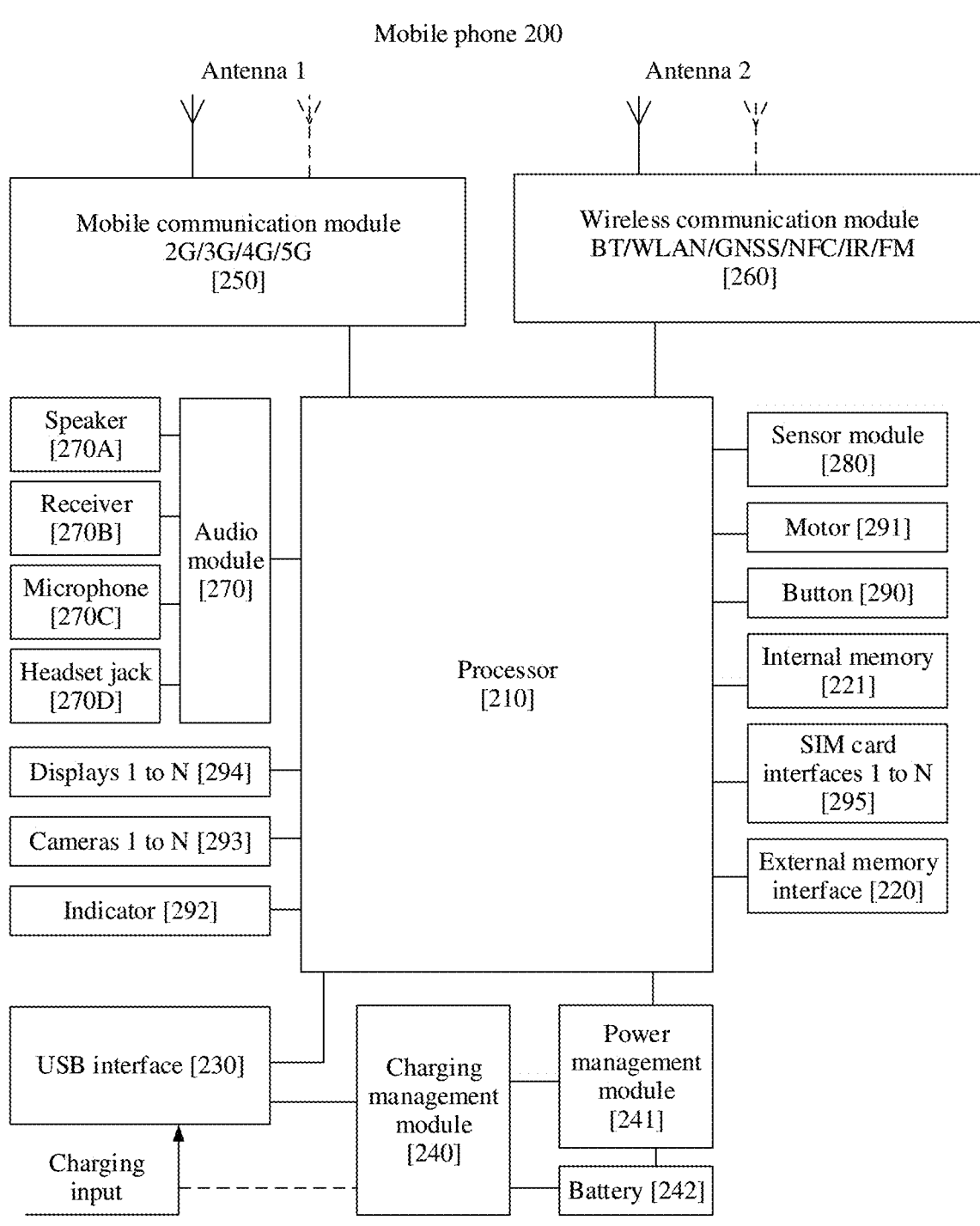
FIG. 2 is a diagram of hardware of an example mobile phone according to an embodiment of the present disclosure.

For example, the display end is a mobile phone in embodiments of the present disclosure. FIG. 2 is a diagram of an example hardware structure of a mobile phone 200 according to an embodiment of the present disclosure. The mobile phone 200 includes a processor 210, an external memory interface 220, an internal memory 221, a universal serial bus (USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (SIM) card interface 295, and the like.

It may be understood that an example structure in embodiments of the present disclosure does not constitute a specific limitation on the mobile phone 200. In some other embodiments of the present disclosure, the mobile phone 200 may include more or fewer components than those shown in the figure, or some components may be combined, or some components may be split, or components are arranged in different manners. The components shown in the figure may be implemented by hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The controller may be a nerve center and a command center of the mobile phone 200. The controller may generate an operation control signal based on an instruction operation code and a time sequence signal, to complete control of instruction reading and instruction execution.

The memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces waiting time of the processor 210, thereby improving system efficiency.

The charging management module 240 is configured to receive charging input from a charger. When charging the battery 242, the charging management module 240 may further supply power to the electronic device by using the power management module 241.

The power management module 241 is configured to connect the battery 242, the charging management module 240, and the processor 210. The power management module 241 receives an input from the battery 242 and/or an input from the charging management module 240, and supplies power to the processor 210, the internal memory 221, an external memory, the display 294, the camera 293, the wireless communication module 260, and the like. The power management module 241 may be further configured to monitor parameters such as a battery capacity, a quantity of battery cycles, and a battery health status (electric leakage and impedance). In some other embodiments, the power management module 241 may alternatively be disposed in the processor 210. In some other embodiments, the power management module 241 and the charging management module 240 may alternatively be disposed in a same component.

A wireless communication function of the mobile phone 200 may be implemented by using the antenna 1, the antenna 2, the mobile communication module 250, the wireless communication module 260, the modem processor, the baseband processor, and the like. The antenna 1 and the antenna 2 are configured to transmit and receive an electromagnetic wave signal.

The mobile communication module 250 may provide a wireless communication solution that includes 2G/3G/4G/5G or the like and that is applied to the mobile phone 200. The mobile communication module 250 may receive an electromagnetic wave through the antenna 1, perform processing such as filtering or amplification on the received electromagnetic wave, and transmit a processed electromagnetic wave to the modem processor for demodulation. The mobile communication module 250 may further amplify a signal modulated by the modem processor, and convert an amplified signal into an electromagnetic wave for radiation through the antenna 1. In some embodiments, at least some functional modules in the mobile communication module 250 may be disposed in the processor 210. In some embodiments, at least some functional modules in the mobile communication module 250 may be disposed in a same component as at least some modules in the processor 210.

The wireless communication module 260 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like and that is applied to the mobile phone 200. The wireless communication module 260 may be one or more components integrating at least one communication processing module. The wireless communication module 260 receives an electromagnetic wave through the antenna 2, performs frequency modulation and filtering processing on the electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2.

In some embodiments, in the mobile phone 200, the antenna 1 and the mobile communication module 250 are coupled, and the antenna 2 and the wireless communication module 260 are coupled, so that the mobile phone 200 can communicate with a network and another device by using a wireless communication technology.

The mobile phone 400 implements a display function by using the GPU, the display 294, the application processor, and the like. The GPU is a microprocessor for image processing, and is connected to the display 294 and the application processor. The GPU is configured to: perform mathematical and geometric computation, and render an image. The processor 210 may include one or more GPUs that execute program instructions to generate or change displayed information.

The display 294 is configured to display an image, a video, or the like. The display 294 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the mobile phone 200 may include one or N displays 294, where N is a positive integer greater than 1.

The mobile phone 200 may implement a photographing function by using the ISP, the camera 293, the video codec, the GPU, the display 294, the application processor, and the like. The ISP is configured to process data fed back by the camera 293. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, luminance, and complexion of the image. The ISP may further optimize parameters such as exposure and a color temperature of a photographing scene. In some embodiments, the ISP may be disposed in the camera 293.

The camera 293 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the mobile phone 200 may include one or N cameras 293, where N is a positive integer greater than 1.

The digital signal processor is configured to process a digital signal, and may process another digital signal (for example, an audio signal) in addition to a digital image signal.

The video codec is configured to compress or decompress a digital video. The mobile phone 200 may support one or more video codecs. In this way, the mobile phone 200 can play or record videos in a plurality of coding formats, for example, moving picture experts group (MPEG)-1, MPEG-2, MPEG-3, and MPEG-4.

The external memory interface 220 may be configured to connect to an external memory card, for example, a micro SD card, to expand a storage capability of the mobile phone 200. The external memory card communicates with the processor 210 through the external memory interface 220, to implement a data storage function. For example, files such as music and videos are stored in the external storage card.

The internal memory 221 may be configured to store computer-executable program code, and the executable program code includes instructions. The processor 210 runs the instructions stored in the internal memory 221, to implement various function applications and data processing of the mobile phone 200. The internal memory 221 may include a program storage area and a data storage area. The program storage area may store an operating system, an application required by at least one function (for example, a voice playing function or an image playing function), and the like. The data storage area may store data (for example, audio data or an address book) created during use of the mobile phone 200, and the like. In addition, the internal memory 221 may include a high-speed random access memory, or may include a nonvolatile memory, for example, at least one magnetic disk storage device, a flash memory, or a universal flash storage (UFS).

The mobile phone 200 may implement an audio function, for example, playing music or recording, by using the audio module 270, the speaker 270A, the receiver 270B, the microphone 270C, the headset interface 270D, the application processor, and the like.

The audio module 270 is configured to convert digital audio information into an analog audio signal for output, and is also configured to convert an analog audio input into a digital audio signal. The audio module 270 may be further configured to encode and decode an audio signal. In some embodiments, the audio module 270 may be disposed in the processor 210, or some functional modules in the audio module 270 may be disposed in the processor 210.

The speaker 270A, also referred to as a "horn", is configured to convert an audio electrical signal into a sound signal. The mobile phone 200 may listen to music or answer a hands-free call by using the speaker 270A.

The receiver 270B, also referred to as an "earpiece", is configured to convert an audio electrical signal into a sound signal. When a call is answered or voice information is received by using the mobile phone 200, the receiver 270B may be put close to a human ear to listen to a voice.

The microphone 270C, also referred to as a "mike" or a "mic", is configured to convert a sound signal into an electrical signal. When making a call or sending voice information, the user may make a sound by using a human mouth close to the microphone 270C, and input a sound signal to the microphone 270C. At least one microphone 270C may be disposed in the mobile phone 200. In some other embodiments, two microphones 270C may be disposed in the mobile phone 200, to capture a sound signal and further implement a noise reduction function. In some other embodiments, three, four, or more microphones 270C may alternatively be disposed in the mobile phone 200, to capture a sound signal, reduce noise, further identify a sound source, implement a directional recording function, and the like.

The headset jack 270D is configured to connect to a wired headset.

The button 290 includes a power button, a volume button, or the like. The mobile phone 200 may receive button input, and generate button signal input related to a user setting and function control of the mobile phone 200.

The motor 291 may generate a vibration prompt. The motor 291 may be configured to provide an incoming call vibration prompt and a touch vibration feedback.

The indicator 292 may be an indicator light, and may be configured to indicate a charging status and a power change, or may be configured to indicate a message, a missed call, a notification, and the like.

The SIM card interface 295 is configured to connect to a SIM card. A SIM card may be inserted into the SIM card interface 295 or removed from the SIM card interface 295, to implement contact with or separation from the mobile phone 200.

It may be understood that in embodiments of the present disclosure, the mobile phone 200 may perform some or all of the steps in embodiments of the present disclosure. These steps or operations are merely examples. The mobile phone 200 may further perform other operations or variations of various operations. In addition, the steps may be performed in a sequence different from a sequence presented in embodiments of the present disclosure, and not all operations in embodiments of the present disclosure need to be performed. Embodiments of the present disclosure may be separately implemented, or may be implemented in any combination. This is not limited in the present disclosure.

With reference to the foregoing content, embodiments of the present disclosure provide a dynamic range mapping method for a panoramic video. As shown in FIG. 3, the method includes step 301 to step 305.

Step 301: An electronic device (namely, a display end) projects any frame of three-dimensional panoramic image in a panoramic video onto a surface of a polyhedron, and extends the polyhedron into a two-dimensional plane, to obtain a two-dimensional panoramic projection image.

It should be understood that after obtaining a bitstream of the panoramic video (for example, receiving the bitstream of the panoramic video from a generation end), the display end performs video decoding, to obtain the panoramic video. Each frame of three-dimensional panoramic image in the panoramic video may be referred to as a three-dimensional spherical surface representation panorama of the panoramic video.

Optionally, the polyhedron onto which the three-dimensional panoramic image is projected as the two-dimensional panoramic projection image includes at least one of: a regular tetrahedron, a regular hexahedron, a regular octahedron, a regular dodecahedron, or a regular icosahedron.

In embodiments of the present disclosure, the process of projecting the three-dimensional panoramic image into the two-dimensional panoramic projection image by using the polyhedron includes: placing, in the polyhedron, a sphere that can express the three-dimensional panoramic image (the three-dimensional panoramic image is expressed by a three-dimensional sphere), so that the sphere becomes an inscribed sphere of the polyhedron (it should be understood that a center of the polyhedron coincides with a spherical center of the sphere); and connecting the spherical center to any point (pixel point) on a spherical surface, and extending a connection line to intersect with a surface of the polyhedron, where a point obtained by projecting the point on the spherical surface onto a surface of the polyhedron is an intersection point of an extension line of the connection line that connects the spherical center to the point on the spherical surface and the surface of the polyhedron; or connecting a point on a surface of the polyhedron to the spherical center, where a connection line intersects with the spherical surface at a point, and the intersection point on the spherical surface and the point on the polyhedron are in a mutual projection relationship. It should be understood that a pixel value of the point on the spherical surface is a pixel value of the intersection point on the surface of the polyhedron. In this way, in the foregoing projection process, all pixels on the three-dimensional spherical surface are projected, to obtain projected pixels on each surface of the polyhedron (interpolation is performed on projected pixels on the two-dimensional plane based on different cases). Finally, the polyhedron is extended into the two-dimensional plane according to a specific rule, to obtain the two-dimensional panoramic projection image.

Figure 4:
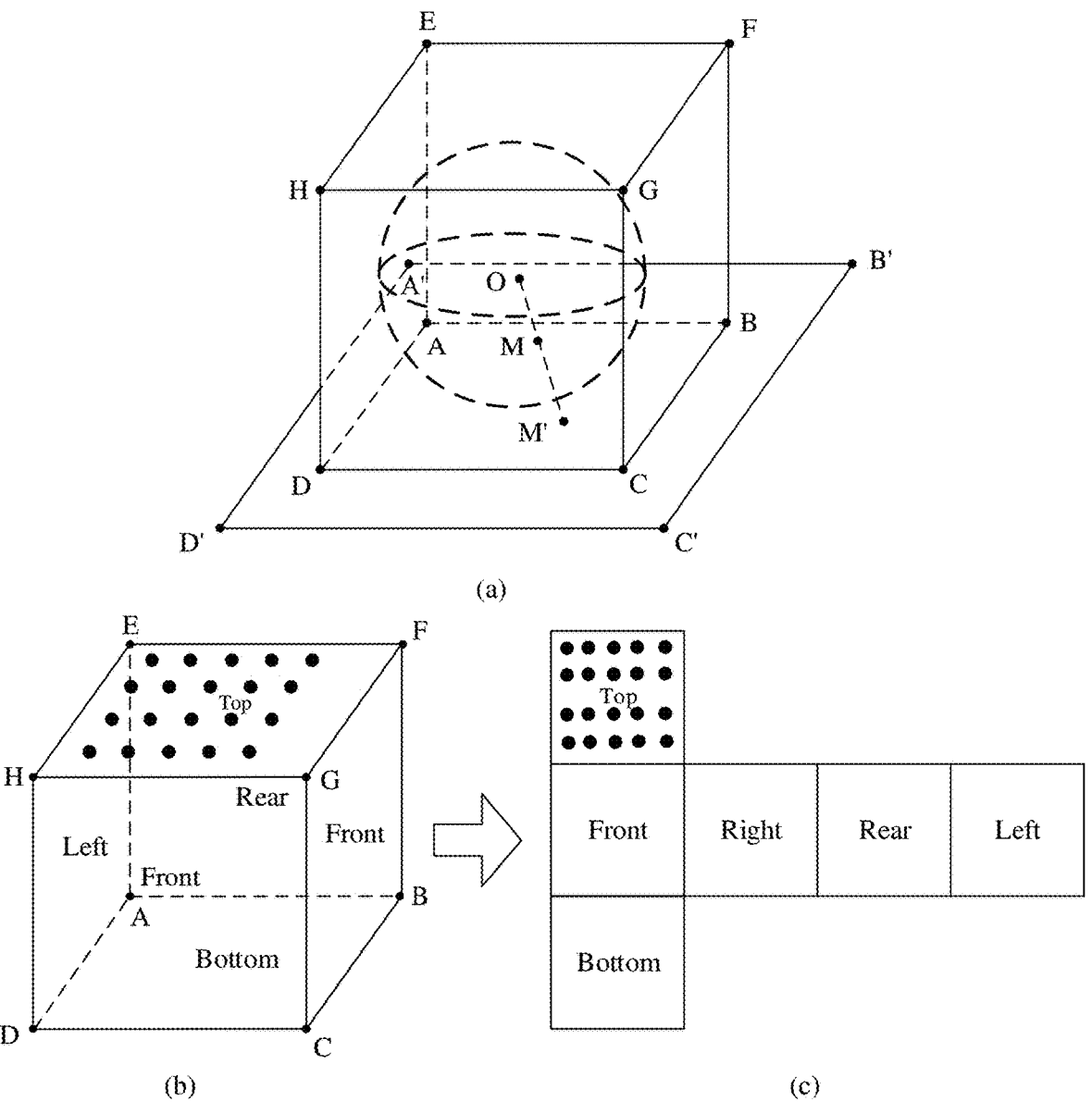
FIG. 4 is a diagram 1 of an example three-dimensional panoramic image projection process according to an embodiment of the present disclosure.

Refer to FIG. 4. An example in which the polyhedron is a regular hexahedron is used, and the regular hexahedron is denoted as ABCDEFGH. As shown in (a) in FIG. 4, the sphere expressing the three-dimensional panoramic image is a sphere inscribed within the regular hexahedron ABCDEFGH. For a point M' on a plane ABCD on a plane A'B'C'D' (the plane ABCD is a bottom surface of the regular hexahedron ABCDEFGH, and the plane A'B'C'D' is a projection plane of the plane ABCD), the point M' is connected to the spherical center O, and the connection line intersects with the spherical surface at a point M. In this way, a pixel value of the point M' is a pixel value of the point M. Similarly, pixel values of all points on the plane ABCD may be obtained, and the pixel points on the plane ABCD form a surface image of the plane ABCD. According to the projection method on the plane ABCD, pixel points of the three-dimensional panoramic image are projected onto other surfaces of the regular hexahedron, to obtain other surface images. As shown in (b) in FIG. 4, after the three-dimensional panoramic image is projected, a surface image of an upper surface EFGH, a surface image of a lower surface ABCD, a surface image of a front surface HGCD, a surface image of a rear surface EFBA, a surface image of a left surface EHDA, and a surface image of a right surface GFBC may be obtained. Further, (b) in FIG. 4 is extended to a two-dimensional plane, to obtain a two-dimensional panoramic image shown in (c) in FIG. 4. It can be seen that the two-dimensional panoramic projection image is in an irregular shape. A surface image of a surface of the polyhedron may be referred to as an image of a region in the two-dimensional panoramic projection image, or a sub-image of the two-dimensional panoramic projection image.

Figures 5, 6:
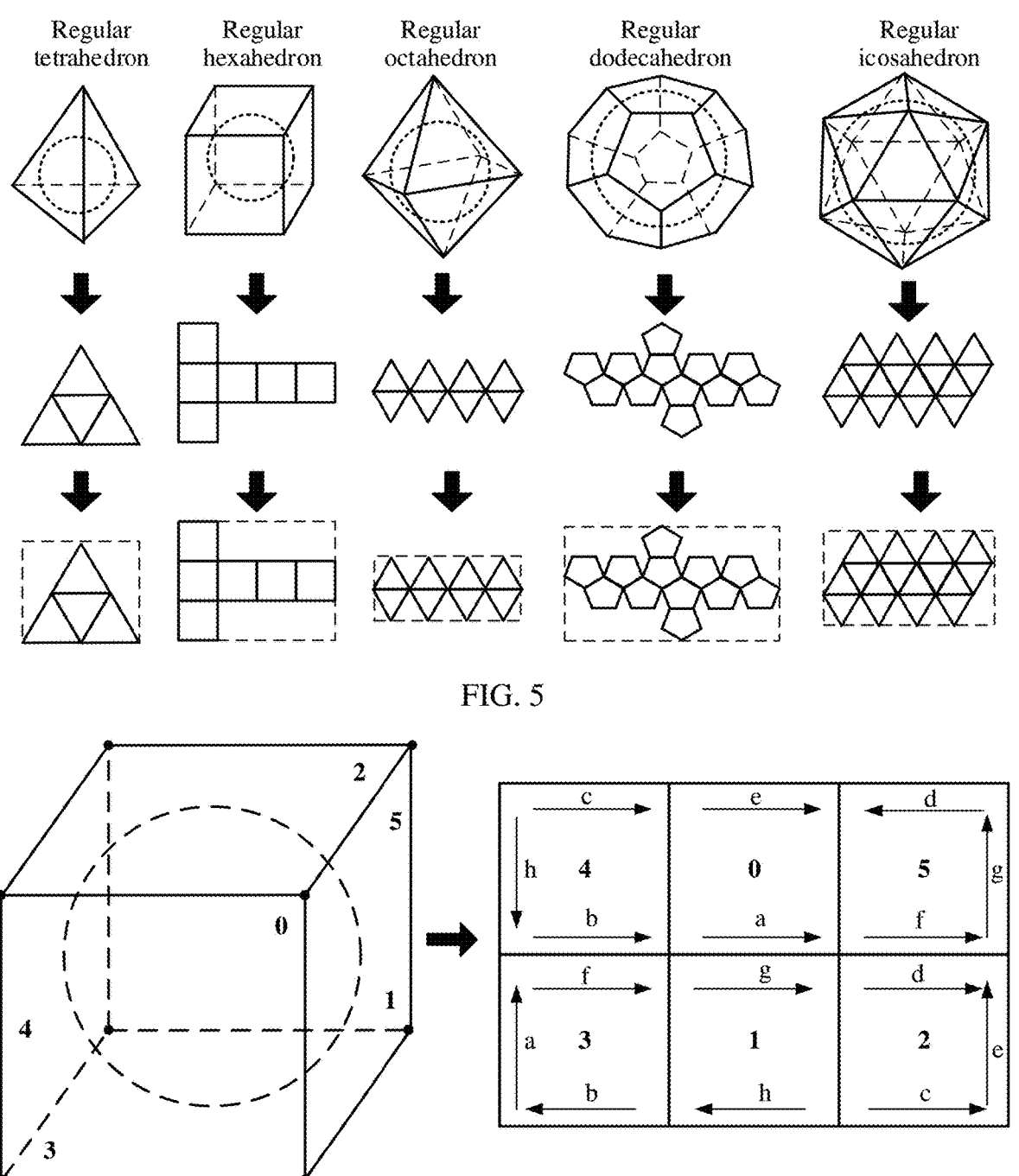
FIG. 5 is a diagram 2 of an example three-dimensional panoramic image projection process according to an embodiment of the present disclosure.
FIG. 6 is a diagram 3 of an example three-dimensional panoramic image projection process according to an embodiment of the present disclosure.

FIG. 5 is an example diagram of projection effect of using the regular tetrahedron, the regular hexahedron, the regular octahedron, the regular dodecahedron, and the regular decahedron. After the three-dimensional panoramic image is projected by using a regular polyhedron shown in a first row in FIG. 5, a corresponding two-dimensional panoramic projection image (a projection result shown in a second row in FIG. 5) is obtained.

In embodiments of the present disclosure, during subsequent processing, the irregular projection image shown in the second row in FIG. 5 may be directly processed, or the irregular image may be converted into a regular image for processing. In an implementation, a rectangular region that encloses the irregular image and that has a minimum area may be processed (reference may be made to a third row in FIG. 5, and a rectangle shown in a dashed box is the rectangle that encloses the irregular image and that has the minimum area). Optionally, another region other than the projection region in the rectangular region may be filled, for example, filled with a preset pixel value. In another implementation, surface images in the irregular projection image may be spliced into a projection image in a regular shape (for example, a rectangle). In this way, pixel filling does not need to be performed.

It should be noted that, in embodiments of the present disclosure, the polyhedron is not limited to a regular polyhedron. In other words, the two-dimensional panoramic projection diagram of the three-dimensional panoramic image may include several polygons of different sizes.

Optionally, in embodiments of the present disclosure, the electronic device may convert the three-dimensional panoramic image into the two-dimensional panoramic projection image by using another method. For example, the three-dimensional panoramic image (the spherical surface) is directly extended. A three-dimensional panoramic image of the earth is used as an example. The three-dimensional panoramic image of the earth is extended into a two-dimensional panoramic image. Specifically, regions adjacent to the north and south poles in the three-dimensional panorama are extended, to obtain content of regions in the north and south poles in the two-dimensional panoramic image.

Step 302: The electronic device splits the two-dimensional panoramic projection image corresponding to the any frame of three-dimensional panoramic image in the panoramic video, to obtain a plurality of regions of the two-dimensional panoramic projection image.

Each of the plurality of regions meets a preset condition, and the preset condition includes at least one of the following condition 1 and condition 2.

Condition 1: Pixels that are adjacent in the two-dimensional panoramic projection image and that are not adjacent in the three-dimensional panoramic image are not located in a same region, where the pixel points that are adjacent in the two-dimensional panoramic projection image include pixels on at least two adjacent projection planes of the three-dimensional panoramic image, and the pixels that are not adjacent in the three-dimensional panoramic image include pixels that are in the three-dimensional panoramic image and that correspond to at least two non-adjacent projection planes.

An example in which the polyhedron onto which the three-dimensional panoramic image is projected is a regular hexahedron is used. As shown in FIG. 6, six surfaces of the regular hexahedron are numbered 0, 1, 2, 3, 4, 5, and 6 in a sequence of a front surface, a rear surface, an upper surface, a lower surface, a left surface, and a right surface. In the two-dimensional panoramic projection image obtained by projecting the three-dimensional panoramic image in FIG. 6, in each surface image (square), an arrow shown by an edge of a square indicates an edge, in the polyhedron, corresponding to the edge. In FIG. 6, edges corresponding to arrows marked with a same letter are a same edge in the polyhedron. An edge corresponding to an arrow marked with a letter a in the surface image 0 (which may also be referred to as a projection plane 0) and an edge corresponding to an arrow marked with a letter a in the surface image 3 are a same edge in the regular hexahedron, that is, an edge where the front surface 0 and the lower surface 3 meet.

In FIG. 6, for two adjacent projection planes of the three-dimensional panoramic image, for example, the projection plane 0 and a projection plane 1, in the two-dimensional panoramic projection image, the projection plane 0 is adjacent to the projection plane 1, and some pixels of the projection plane 0 are adjacent to some pixels of the projection plane 1. For example, a pixel on the edge corresponding to the arrow marked with the letter a on the projection plane 0 is adjacent to a pixel on an edge corresponding to an arrow marked with a letter g on the projection plane 1. A pixel, of the three-dimensional panoramic image, corresponding to the projection plane 0 and a pixel, of the three-dimensional panoramic image, corresponding to the projection plane 1 are pixels that are not adjacent in the three-dimensional panoramic image.

When the two-dimensional panoramic projection image obtained in FIG. 6 is split, it needs to be ensured that pixels that are adjacent in the two-dimensional panoramic projection image and that are not adjacent in the three-dimensional panoramic image are not located in a same region. For example, the pixel on the edge corresponding to the arrow marked with the letter a on the projection plane 0 and the pixel on the edge corresponding to the arrow marked with the letter g on the projection plane 1 in FIG. 6 are pixels that are adjacent in the two-dimensional panoramic projection image. However, the pixel on the edge corresponding to the arrow marked with the letter a on the projection plane 0 and the pixel on the edge corresponding to the arrow marked with the letter g on the projection plane 1 are pixels that are not adjacent in the three-dimensional panoramic image. Therefore, it needs to be ensured that the pixel on the edge corresponding to the arrow marked with the letter a on the projection plane 0 and the pixel on the edge corresponding to the arrow marked with the letter g on the projection plane 1 are not split into a same region. In other words, when the two-dimensional panoramic projection image is horizontally split, splitting cannot be performed across a line where the projection plane 0 and the projection plane 1 meet, that is, pixels on two sides of the line cannot be split into one region. Similarly, pixels on two sides of a line where a projection plane 4 and a projection plane 3 meet cannot be split into a same region, and pixels on two sides of a line where a projection plane 5 and a projection plane 2 meet cannot be split into a same region.

Condition 2: Pixels that are not adjacent in the three-dimensional panoramic image are not located in a same region, where the pixels that are not adjacent in the three-dimensional panoramic image include pixels that are in the three-dimensional panoramic image and that correspond to at least two non-adjacent projection planes.

Refer to the example in the condition 1. The pixel, of the three-dimensional panoramic image, corresponding to the projection plane 0 and the pixel, of the three-dimensional panoramic image, corresponding to the projection plane 1 in FIG. 6 are pixels that are not adjacent in the three-dimensional panoramic image. When the two-dimensional panoramic projection image is split, it needs to be ensured that the pixel of the projection plane 0 and the pixel of the projection plane 1 are not split into a same region. For example, the pixel on the edge corresponding to the arrow marked with the letter a on the projection plane 0 and the pixel on the edge corresponding to the arrow marked with the letter g on the projection plane 1 are not split into a same region. In other words, when the two-dimensional panoramic projection image is horizontally split, splitting cannot be performed across a line where the projection plane 0 and the projection plane 1 meet, that is, pixels on two sides of the line cannot be split into one region. Similarly, pixels on two sides of a line where a projection plane 4 and a projection plane 3 meet cannot be split into a same region, and pixels on two sides of a line where a projection plane 5 and a projection plane 2 meet cannot be split into a same region.

In embodiments of the present disclosure, in a process of splitting the two-dimensional panoramic projection image, when each region obtained through splitting meets the preset condition, it can be ensured that pixels with similar luminance (similar luminance indicates similar dynamic ranges) are split into a same region, and pixels that differ greatly in luminance (a large luminance difference indicates a large dynamic range difference) are not split into a same region. For example, in the three-dimensional panoramic projection image in FIG. 6, a pixel corresponding to the projection plane 2 may be a pixel of the sky, and a pixel corresponding to the projection plane 5 may be a pixel of the ground. Because luminance of the pixel of the sky differs greatly from luminance of the pixel of the ground, the pixel of the projection plane 2 and the pixel of the projection plane 5 are not located in a same region in the process of splitting the two-dimensional panoramic projection image. Because dynamic ranges of pixels in a same region are similar, dynamic range mapping may be performed on the pixels in the same region based on same dynamic range mapping information. Because dynamic ranges of pixels in different regions may differ greatly, dynamic range mapping may be performed on the pixels in different regions based on different dynamic range mapping information. Therefore, after the two-dimensional panoramic projection image is split into the plurality of regions in this split manner, the subsequent processing (namely, dynamic range mapping) is performed on each region. A feature of the pixel in each region may be adaptively adapted for process, to improve processing effect.

Optionally, the electronic device may split the two-dimensional panoramic projection image in different split manners. In embodiments of the present disclosure, the electronic device may split the two-dimensional panoramic projection image by using any one of step 3021, step 3022, or step 3023 and step 3024.

With reference to FIG. 3, as shown in FIG. 7, a manner of splitting the two-dimensional panoramic projection image provided in embodiments of the present disclosure specifically includes step 3021 (that is, step 302 is implemented by using step 3021).

Step 3021: The electronic device splits the two-dimensional panoramic projection image in a first split manner, to obtain the plurality of regions of the two-dimensional panoramic projection image, where the first split manner is splitting pixels, in the two-dimensional panoramic projection image, belonging to a same surface of the polyhedron into a region.

The regular hexahedron shown in FIG. 6 is still used as an example. Refer to FIG. 8. After the three-dimensional panoramic projection image is projected by using the regular hexahedron, an obtained two-dimensional panoramic projection image includes six projection planes. The first split manner is splitting pixels, in the two-dimensional panoramic projection image, belonging to a same surface of the polyhedron into a region, that is, each projection plane of the two-dimensional panoramic projection image is used as a region. As shown in FIG. 8, the two-dimensional panoramic projection image may be split into six regions in the first split manner, which are respectively a region A, a region B, a region C, a region D, a region E, and a region F in FIG.

8. Refer to FIG. 8. Each of the plurality of regions obtained by splitting the two-dimensional panoramic projection image in the first split manner meets the preset condition (including a condition 1 or a condition 2), that is, pixels that are adjacent in the two-dimensional panoramic projection image and that are not adjacent in the three-dimensional panoramic image are not located in a same region.

With reference to FIG. 3, as shown in FIG. 9, another example manner of splitting the two-dimensional panoramic projection image provided in embodiments of the present disclosure specifically includes step 3022 (that is, step 302 is implemented by using step 3022).

Step 3022: The electronic device splits the two-dimensional panoramic projection image in a second split manner, to obtain the plurality of regions of the two-dimensional panoramic projection image, where the second split manner is splitting pixels, in the two-dimensional panoramic projection image, belonging to a same surface of the polyhedron (used for projection) into a region, to obtain a plurality of intermediate regions, and further splitting at least one of the plurality of intermediate regions.

Figure 10:
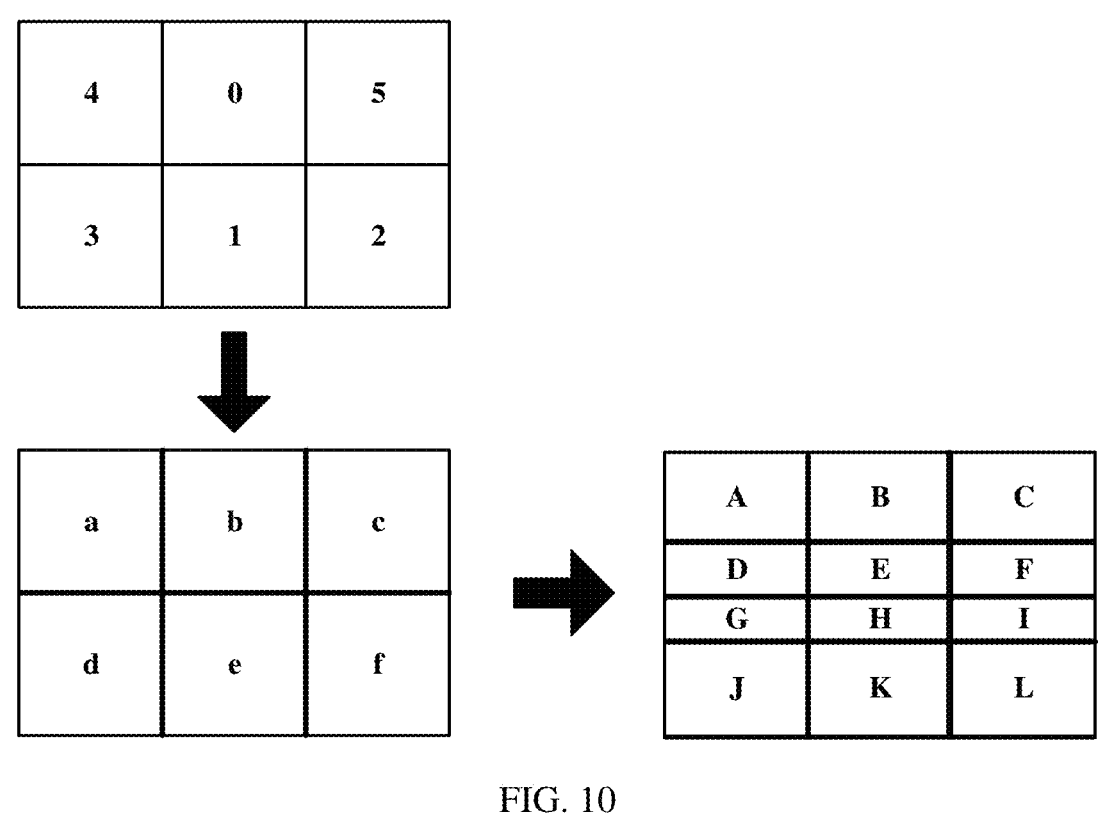

The regular hexahedron shown in FIG. 6 is still used as an example. Refer to FIG. 10. After the three-dimensional panoramic projection image is projected by using the regular hexahedron, an obtained two-dimensional panoramic projection image includes six projection planes. The second split manner is splitting pixels, in the two-dimensional panoramic projection image, belonging to a same surface of the polyhedron (used for projection) into a region, to obtain a plurality of intermediate regions, and further splitting at least one of the plurality of intermediate regions. In other words, the two-dimensional panoramic projection image is first split in the first split manner, to obtain the plurality of regions as the plurality of intermediate regions; and then one or more of the plurality of intermediate regions are split, to obtain the plurality of regions as a final split result. As shown in FIG. 10, after the two-dimensional panoramic projection image is split in the first split manner, six intermediate regions are obtained, which are respectively an intermediate region a, an intermediate region b, an intermediate region c, an intermediate region d, an intermediate region e, and an intermediate region f. Then, each of the six intermediate regions is horizontally split in half, to finally obtain 12 regions. In other words, the two-dimensional panoramic projection image may be split into 12 regions in the second split manner, which are respectively a region A, a region B, a region C, a region D, a region E, a region F, a region G, a region H, a region I, a region J, a region K, and a region L in FIG. 10. Refer to FIG. 10. Each of the plurality of regions obtained by splitting the two-dimensional panoramic projection image in the second split manner meets the preset condition (including a condition 1 or a condition 2), that is, pixels that are adjacent in the two-dimensional panoramic projection image and that are not adjacent in the three-dimensional panoramic image are not located in a same region.

With reference to FIG. 3, as shown in FIG. 11, still another manner of splitting the two-dimensional panoramic projection image provided in embodiments of the present disclosure specifically includes step 3023 and step 3024 (that is, step 302 is implemented by using step 3023 and step 3024).

Step 3023: The electronic device splits the two-dimensional panoramic projection image in a third split manner, to obtain a plurality of intermediate regions of the two-dimensional panoramic projection image, where the third split manner is clustering all pixels in the two-dimensional panoramic projection image, and splitting pixels belonging to a same category into a same intermediate region.

In embodiments of the present disclosure, a process of clustering all pixels in the two-dimensional panoramic projection image in the third split manner includes:

A clustering center is first determined, where the clustering center is one pixel. Optionally, the two-dimensional panoramic projection image may be first split into a plurality of regions in a preset split manner, a pixel value of a central location of each region is determined, and the pixel value of the central location of each region is used as the clustering center. For example, it is assumed that the two-dimensional panoramic projection image is an image obtained through projection by using the regular hexahedron shown in FIG. 6. If the two-dimensional panoramic projection image is split into six regions, the two-dimensional panoramic projection image may be split into six regions in the first split manner, and a pixel value of a central location of each region is determined, to obtain six clustering centers. If the two-dimensional panoramic projection image is split into 12 regions, the two-dimensional panoramic projection image may be split into 12 regions in the second split manner, and a pixel value of a central location of each region is determined, to obtain 12 clustering centers.

Then, calculation is performed, according to a preset clustering algorithm and the determined clustering center, on distances (the distance is calculated based on coordinates of a pixel and coordinates of a pixel corresponding to the clustering center) between all pixel points and each clustering center, where the distance may be denoted as $D_i$. Then, calculation is performed on differences between luminance values of all pixel points and luminance values of pixel points corresponding to clustering centers (calculation is performed on differences between luminance values of all pixel points and an average luminance value of pixel points of a category (namely, a category obtained through splitting in the preset split manner) corresponding to each clustering center; calculation is performed on differences between color values of all pixel points and color values of pixel points corresponding to clustering centers; or calculation is performed on differences between color values of all pixel points and an average color value of pixel points of a category (namely, a category obtained through splitting in the preset split manner) corresponding to each clustering center), where the difference is denoted as $E_i$. Each pixel is split into a category corresponding to a corresponding clustering center based on a weighted value of the distance $D_i$ and $E_i$, to obtain a clustering result. A category with a minimum weighted value is a category corresponding to the pixel, and pixel points of each category in the clustering result form a region.

It should be noted that splitting the two-dimensional panoramic projection image according to the foregoing clustering method in step 3023 cannot ensure whether the plurality of obtained intermediate regions meet the preset condition (including the condition 1 or the condition 2). Therefore, the plurality of intermediate regions obtained through clustering need to be determined, to determine whether the plurality of intermediate regions meet the preset condition. If the plurality of intermediate regions all meets the preset condition, the plurality of intermediate regions are used as the final split result, that is, the plurality of intermediate regions is used as the plurality of regions obtained by splitting the two-dimensional panoramic projection image. If there is an intermediate region that does not meet the preset condition in the plurality of intermediate regions, the electronic device continues to perform step 3024.

Step 3024: The electronic device splits, in a fourth split manner, an intermediate region that does not meet the preset condition in the plurality of intermediate regions, to obtain the plurality of regions. For any intermediate region that does not meet the preset condition, the fourth split manner is splitting the intermediate region along a boundary line of at least two surfaces, included in the intermediate region, of the polyhedron.

Figure 12:
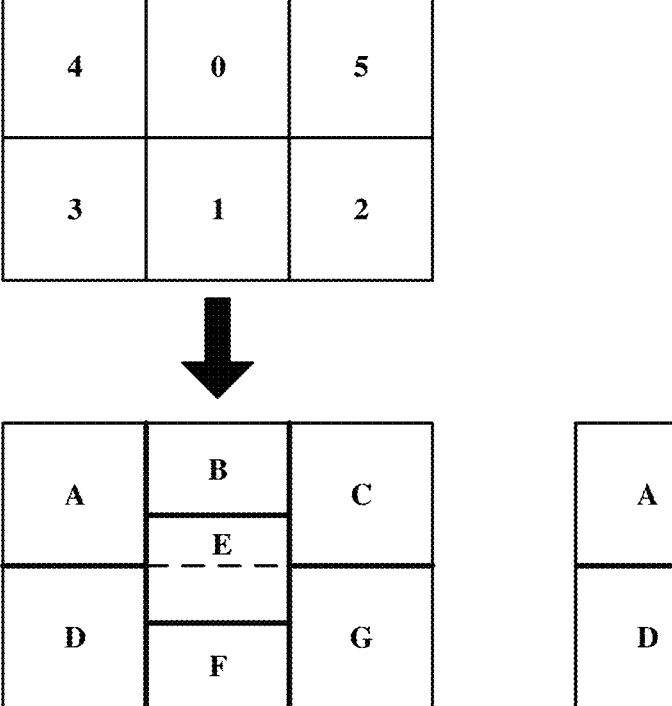
FIG. 12 is a diagram 3 of a split result of an example two-dimensional panoramic projection image according to an embodiment of the present disclosure.

An example in which the two-dimensional panoramic projection image is an image obtained through projection onto the regular hexahedron shown in FIG. 6 is still used. Refer to FIG. 12. It is assumed that a quantity of categories set during clustering is 7. After all pixels of the two-dimensional panoramic projection image are clustered, seven intermediate regions are obtained, which are respectively an intermediate region A, an intermediate region B, an intermediate region C, an intermediate region D, an intermediate region E, an intermediate region F, and an intermediate region G. Because the intermediate region E does not meet the preset condition (the other intermediate regions meet the preset condition), the intermediate region E needs to be further split. As shown in FIG. 12, it can be seen that the intermediate region E includes some pixels of two projection planes (a projection plane 0 and a projection plane 1), and the intermediate region E may be split into a region I and a region H along a line where the projection plane 0 and the projection plane 1 meet in the intermediate region E. In this way, the two-dimensional panoramic projection image is finally split into eight regions: the region A, the region B, the region C, the region I, the region D, the region H, the region F, and the region G.

In embodiments of the present disclosure, a proper split manner may be selected from the foregoing three split manners based on an actual requirement to split the two-dimensional panoramic projection image, or another split manner other than the foregoing three split manners may be used to split the two-dimensional panoramic projection image, provided that the split manner can ensure that each region obtained through splitting meets the preset condition.

Optionally, in embodiments of the present disclosure, a split manner of the two-dimensional panoramic projection image may be preset (for example, agreed on according to a protocol) in the electronic device, for example, set to the first split manner, the second split manner, or the third split manner. Alternatively, a split manner of the two-dimensional panoramic projection image is transferred in a bitstream (specifically in metadata).

With reference to descriptions about the split manner of the two-dimensional panoramic projection image in the foregoing embodiments, it may be learned that the first split manner is related to the second split manner, and a split result of the second split manner is a re-split result based on the first split manner.

In an implementation, if candidate split manners of the two-dimensional panoramic projection image include the first split manner and the second split manner, whether further splitting needs to be performed after splitting in the first splitting manner may be determined based on content of the two-dimensional panoramic projection image, that is, determining to use the first splitting manner or the second splitting manner. Specifically, the following process is performed to determine whether further splitting needs to be performed on a split result of the first split manner.

S1: Split the two-dimensional panoramic projection image in the first split manner, to obtain the plurality of intermediate regions.

S2 to S5 are performed on each of the plurality of intermediate regions, to determine whether each intermediate region needs to be further split.

S2: Calculate a histogram of the intermediate region.

For example, the histogram of the intermediate region is denoted as HISA. In embodiments of the present disclosure, the histogram may be a grayscale histogram or a color histogram. This is not limited in embodiments of the present disclosure.

S3: Split the intermediate region into a plurality of regions, and calculate a histogram of each region.

Optionally, one intermediate region may be evenly split into four regions, and each region occupies a quarter of an area of the intermediate region. The four regions obtained through splitting are respectively denoted as a region 0, a region 1, a region 2, and a region 3, and histograms of the four regions are respectively denoted as HISB[0], HISB[1], HISB[2], and HISB[3].

S4: Calculate a sum of difference values between histograms of the intermediate regions and histograms of the regions obtained by splitting the intermediate regions.

A difference value between the histogram of the intermediate region and the histogram of each region obtained through splitting is first calculated, where the difference value is a difference between a histogram obtained by multiplying the histogram of the intermediate region by n and a corresponding element of the histogram of each region. All differences are summed, where n is a quantity of regions obtained by splitting the intermediate region. For example, if the intermediate region is split into four regions, n=4. Then, the difference values are summed.

The sum of the difference values is denoted as DiffAB, where $$DiffAB = DiffAB[0] + DiffAB[1] + DiffAB[2] + DiffAB[3]$$

DiffAB[0] indicates a difference value between the histogram of the intermediate region and a histogram of the region 0, DiffAB [1] indicates a difference value between the histogram of the intermediate region and a histogram of the region 1, DiffAB [2] indicates a difference value between the histogram of the intermediate region and a histogram of the region 2, and DiffAB [3] indicates a difference value between the histogram of the intermediate region and a histogram of the region 3.

S5: If DiffAB>T1, and T1 is a preset threshold, the intermediate region needs to be further split, that is, the two-dimensional panoramic projection image is split in the second split manner; or if DiffAB≤T1, the intermediate region does not need to be further split, that is, the two-dimensional panoramic projection image is split in the first split manner.

If DiffAB>T1, it indicates that a luminance difference between parts in the intermediate region is large, and further splitting needs to be performed.

Because the first split manner is related to the second split manner, in some cases, if a default split manner is the first split manner, a related identifier may be used in the bitstream to indicate whether further splitting is performed. When the identifier indicates that no further splitting is performed, the split result obtained in the first split manner is a final result. When the identifier indicates that further splitting needs to be performed, the split result of the first split manner is further split.

In another implementation, if candidate split manners of the two-dimensional panoramic projection image include the first split manner, the second split manner, and the third split manner, which split manner is used may be determined by performing the following process:

S11: Split the two-dimensional panoramic projection image in the first split manner, the second split manner, and the third split manner.

S12: Separately calculate a histogram of each region obtained in the first split manner, the second split manner, and the third split manner, and a histogram of the two-dimensional panoramic projection image.

S13: Calculate a sum of difference values between histograms of a plurality of regions obtained in each split manner and the histogram of the two-dimensional panoramic projection image.

For example, it is assumed that the two-dimensional panoramic projection image is split in the first split manner to obtain M regions, and a sum of difference values between histograms of the plurality of regions obtained in the first split manner and the histogram of the two-dimensional panoramic projection image is denoted as DiffHISM. Calculating the sum of difference values is similar to the process in S4. A difference value between a histogram of each region and the histogram of the two-dimensional panoramic projection image is first calculated, where the difference value is a difference between a histogram obtained by multiplying the histogram of each region by M and a corresponding element of the histogram of the two-dimensional panoramic projection image. All differences are summed, and the difference values are summed as follows:

$$DiffHISM = DiffHISM[0] + DiffHISM[1] + ... + DiffHISM[M]$$

DiffHISM[0] indicates a difference value of a histogram of a region 0 obtained in the first split manner and the histogram of the two-dimensional panoramic projection image, DiffHISM[M] indicates a difference value of a histogram of a region M obtained in the first split manner and the histogram of the two-dimensional panoramic projection image, and the rest may be deduced by analogy.

It is assumed that the two-dimensional panoramic projection image is split in the second split manner to obtain N regions, and a sum of difference values between histograms of the plurality of regions obtained in the second split manner and the histogram of the two-dimensional panoramic projection image is denoted as DiffHISN. Calculating the sum of difference values is similar to the process in S4. A difference value between a histogram of each region and the histogram of the two-dimensional panoramic projection image is first calculated, where the difference value is a difference between a histogram obtained by multiplying the histogram of each region by N and a corresponding element of the histogram of the two-dimensional panoramic projection image. All differences are summed, and the difference values are summed as follows:

$$DiffHISN = DiffHISN[0] + DiffHISN[1] + ... + DiffHISN[N]$$

33

DiffHISN[0] indicates a difference value of a histogram of a region 0 obtained in the second split manner and the histogram of the two-dimensional panoramic projection image, DiffHISN [N] indicates a difference value of a histogram of a region N obtained in the second split manner and the histogram of the two-dimensional panoramic projection image, and the rest may be deduced by analogy.

It is assumed that the two-dimensional panoramic projection image is split in the third split manner to obtain P regions, and a sum of difference values between histograms of the plurality of regions obtained in the third split manner and the histogram of the two-dimensional panoramic projection image is denoted as DiffHISP. Calculating the sum of difference values is similar to the process in S4. A difference value between a histogram of each region and the histogram of the two-dimensional panoramic projection image is first calculated, where the difference value is a difference between a histogram obtained by multiplying the histogram of each region by P and a corresponding element of the histogram of the two-dimensional panoramic projection image. All differences are summed, and the difference values are summed as follows:

$$DiffHISP = DiffHISP[0] + DiffHISP[1] + \ldots + DiffHISP[P]$$

DiffHISP[0] indicates a difference value of a histogram of a region 0 obtained in the third split manner and the histogram of the two-dimensional panoramic projection image, DiffHISP[P] indicates a difference value of a histogram of a region P obtained in the third split manner and the histogram of the two-dimensional panoramic projection image, and the rest may be deduced by analogy.

S14: Determine a split manner with a maximum sum of difference values between histograms as a final split manner.

Sums DiffHISM, DiffHISN, and DiffHISP of difference values between histograms are compared, and a larger sum of difference values between histograms indicates a larger luminance difference between regions obtained through splitting, and indicates that splitting is proper.

Optionally, sizes of metadata in the three split manners may be further calculated, and the metadata includes dynamic mapping information corresponding to each region of the two-dimensional panoramic projection image (details are described in step 303). Then, which split manner is used is determined based on a weighted value between a sum of difference values of histograms corresponding to the split manner described in S13 and a size of the metadata corresponding to the split manner. For example, a size of metadata corresponding to the first split manner is denoted as Size1, a size of metadata corresponding to the second split manner is denoted as Size2, a size of metadata corresponding to the third split manner is denoted as Size3, calculation is performed on DiffHISM-Size1 (a difference is denoted as err1), DiffHISN-Size2 (a difference is denoted as err2), and DiffHISP[P]-Size3 (a difference is denoted as err3), err1, err2, and err3 are compared, and a split manner with a maximum difference is determined as a final split manner.

Step 303: The electronic device obtains metadata of the two-dimensional panoramic projection image, where the metadata includes metadata information elements separately corresponding to the plurality of regions of the two-dimensional panoramic projection image, and a metadata information element corresponding to one region includes dynamic mapping information of the region.

It may be understood that, in embodiments of the present disclosure, an idea of performing dynamic range mapping on the panoramic video is to project all three-dimensional panoramic images included in the panoramic video onto a two-dimensional plane, perform dynamic range mapping on an obtained two-dimensional panoramic projection image, and convert the two-dimensional panoramic projection image obtained through dynamic range mapping into a three-dimensional panoramic image, to obtain a panoramic video obtained through dynamic range mapping. In other words, the obtained metadata of the two-dimensional panoramic projection image is used to perform dynamic range mapping on the three-dimensional panoramic image (that is, used to perform dynamic range mapping on the panoramic video), and the metadata of the two-dimensional panoramic projection image may be considered as metadata of the three-dimensional panoramic image (or metadata of the panoramic video). Metadata mentioned in the following embodiments is data used for dynamic range mapping.

Optionally, a method in which the electronic device obtains the metadata of the two-dimensional panoramic projection image may be: The electronic device receives the metadata of the two-dimensional panoramic projection image from another electronic device (the generation end). It can be learned from the descriptions about the foregoing embodiments that after generating the metadata, the generation end encodes the metadata into the bitstream and sends the bitstream to the display end, so that the display end receives the bitstream and parses the bitstream, to obtain the metadata.

In embodiments of the present disclosure, the two-dimensional panoramic projection image is split into the plurality of regions, that is, the two-dimensional panoramic projection image includes the plurality of regions, and each region corresponds to one metadata information element.

In embodiments of the present disclosure, the metadata information element includes the dynamic mapping information, the dynamic mapping information includes a dynamic mapping parameter, and dynamic range mapping may be performed on the pixel based on the dynamic mapping parameter. Optionally, a format of the dynamic mapping information may be histogram information or dynamic mapping curve information in the ST2094-40 standard, or may be dynamic mapping curve information in the ST2094-10 standard. This is not limited in embodiments of the present disclosure.

It can be learned from the descriptions about the foregoing embodiments that the split manner of the two-dimensional panoramic projection image may be transferred in the bitstream. Optionally, when the bitstream is used to transfer the split manner of the two-dimensional panoramic projection image, the metadata of the two-dimensional panoramic projection image further includes split manner indication information, where the split manner indication information indicates that a split manner of the two-dimensional panoramic projection image is the first split manner, the second split manner, or the third split manner.

Step 304: The electronic device determines dynamic mapping information of each pixel in a current angle of view range based on respective dynamic mapping information of the plurality of regions.

It should be understood that when a user watches the panoramic video, the user (head) cannot see all content of the panoramic video in a current posture, but can see only content of the video in a specific range. The range may be understood as an angle of view range of the user. It can be learned that the angle of view range of the user is related to a current viewing posture of the user. In embodiments of the present disclosure, performing dynamic range mapping on the panoramic video is performing dynamic range mapping on content in the angle of view range of the user currently watching the panoramic video.

In embodiments of the present disclosure, after obtaining the dynamic mapping information of the plurality of regions, the electronic device may determine dynamic mapping information of each pixel in the current angle of view range in any one of the four manners based on the dynamic mapping information of the plurality of regions. Specifically, for one of the pixels, several manners of determining the dynamic mapping information of the pixel are described in detail.

Manner 1: Dynamic mapping information of a to-be-processed pixel in the current angle of view range is dynamic mapping information of a plurality of regions in a first preset range, and the first preset range is a range centered on the to-be-processed pixel.

For example, the first preset range is a range, centered on the to-be-processed pixel, of three pixels×three pixels. It is assumed that the first preset range covers pixels in three regions (that is, the pixels in the first preset range belong to the three regions), all dynamic mapping information of the three regions is used as dynamic mapping information of the to-be-processed pixel.

Manner 2: Dynamic mapping information of a to-be-processed pixel in the current angle of view range is dynamic mapping information of a region to which a pixel that corresponds to a viewpoint center of the current angle of view range and that is in the two-dimensional panoramic projection image belongs.

It should be understood that, when the user watches the panoramic video, the current angle of view range of the user corresponds to a viewpoint center. It is assumed that the viewpoint center is X, and a pixel corresponding to the viewpoint center X in the two-dimensional projection image is X', dynamic mapping information of a region to which X' belongs is used as dynamic mapping information of a current to-be-processed pixel.

Manner 3: Dynamic mapping information of a to-be-processed pixel in the current angle of view range is dynamic mapping information of a plurality of regions in a second preset range, and the second preset range is a range centered on a pixel that corresponds to a viewpoint center of the current angle of view range and that is in the two-dimensional panoramic projection image.

With reference to the manner 2, the example in which viewpoint center of the current angle of view range is X is still used. The pixel corresponding to the viewpoint center X in the two-dimensional projection image is X'. For example, the second preset range may be a range, centered on X', of three pixels×three pixels. It is assumed that the second preset range covers pixels in two regions (that is, the pixels in the second preset range belong to the two regions), all dynamic mapping information of the two regions is used as dynamic mapping information of the to-be-processed pixel.

Manner 4: Dynamic mapping information of one pixel in the current region is dynamic mapping information of the current region.

In other words, dynamic mapping information of a region to which the to-be-processed pixel belongs is used as the dynamic mapping information of the to-be-processed pixel.

Optionally, during actual application, the generation end may select a proper manner from the four manners based on an actual requirement to determine the dynamic mapping information of the to-be-processed pixel, and transfer the selected manner carried in (the metadata of) the bitstream to the display end. Alternatively, the generation end and the display end may pre-determine a manner to be used. This is not limited in embodiments of the present disclosure.

Step 305: The electronic device performs dynamic range mapping on each pixel in the current angle of view range based on the dynamic mapping information of each pixel in the current angle of view range, to obtain a two-dimensional panoramic projection image in the current angle of view range, where the two-dimensional panoramic projection image in the current angle of view range is used for display or subsequent processing.

Optionally, the dynamic mapping information in embodiments of the present disclosure is used to map a dynamic range of the pixel of the two-dimensional panoramic projection image from a first dynamic range to a second dynamic range; or the dynamic mapping information is used to map a dynamic range of the pixel of the two-dimensional panoramic projection image from a second dynamic range to a first dynamic range. The first dynamic range is larger than the second dynamic range. In other words, the dynamic range mapping performed on the pixel may be high-to-low dynamic range mapping or low-to-high dynamic range mapping, for example, may include several cases shown in Table 1 in the foregoing embodiments.

For example, the dynamic mapping information is a dynamic mapping curve. In embodiments of the present disclosure, the dynamic mapping curve may include but is not limited to a sigmoidal curve, a cubic spline curve, a Bezier curve, and the like.

A sigmoidal curve is used as an example. The curve is L'=F(L), where L indicates a pixel before dynamic range mapping, and L' indicates a pixel after dynamic range mapping.

An expression of F(L) is:

$$F(L) = a \times \left( \frac{p \times L^n}{(p-1) \times L^n + 1} \right)^m + b,$$

where
a, b, p, m, and n are parameters of the dynamic mapping curve, and the parameters of the dynamic mapping curve are obtained from the metadata.

Optionally, L and L' are normalized values. The normalization may be normalization of linear space, or may be normalization of non-linear space. In addition, a range of the normalization is not limited in embodiments of the present disclosure. For example, the range of the normalization may be 0 to 10000 nit, or may be 0.001 to 100000 nit.

Optionally, after dynamic range mapping is performed on each pixel in the current angle of view range, to obtain the two-dimensional panoramic projection image in the current angle of view range, the two-dimensional panoramic projection image may be displayed. In one case, reverse normalization may be performed on the pixel (L') of the two-dimensional panoramic projection image based on a display capability (a maximum display value and a minimum display value) of a display device, to normalize the pixel to a range of the display capability of the display device.

In embodiments of the present disclosure, after the dynamic mapping information of each pixel in the current angle of view range is determined by using the steps, a pixel may correspond to a plurality of pieces of dynamic mapping information (for example, corresponding to a plurality of dynamic mapping curves). After dynamic range mapping is performed on the pixel in step 305, one dynamic mapping result may be obtained for each piece of dynamic mapping information. In this case, a plurality of dynamic mapping results may be processed, to obtain a final dynamic mapping result. A processing manner may include any one of the following:

Processing manner 1: A median value of the plurality of dynamic mapping results is used as the final dynamic mapping result.

Processing manner 2: Weighted averaging is performed on the plurality of dynamic mapping results, to obtain the final dynamic mapping result.

It is assumed that the to-be-processed pixel includes n pieces of dynamic mapping information. n dynamic mapping results Result_1, Result_2, . . . , and Result_n may be obtained, weighting coefficients corresponding to the n dynamic mapping results are $W_1$, $W_2$, . . . , and $W_n$, and a final mapping result R is as follows:

$$R = \frac{W_1 \times \text{Result\_1} + W_2 \times \text{Result\_2} + \ldots + W_n \times \text{Result\_n}}{n}$$

In embodiments of the present disclosure, when the plurality of dynamic mapping results are processed in the processing manner 2, a weighting coefficient corresponding to each dynamic mapping result may be a preset weighting coefficient, or may be a weighting coefficient determined based on the current to-be-processed pixel.

That the weighting coefficient is determined based on the current to-be-processed pixel specifically includes: calculating a distance between the to-be-processed pixel and a pixel at a central location of a region corresponding to each piece of dynamic mapping information; and calculating the weighting coefficient based on each distance. For example, the current to-be-processed pixel is Y, dynamic mapping information of Y includes dynamic mapping information corresponding to three regions, and pixels at central locations of the three regions are respectively $Y_1'$, $Y_2'$, and $Y_3'$. Calculation is performed on a distance $D_1$ between Y and $Y_1'$, a distance $D_2$ between Y and $Y_2'$, and a distance $D_3$ between Y and $Y_3'$, and the weighting coefficient is determined based on $D_1$, $D_2$, and $D_3$. Optionally, in embodiments of the present disclosure, a smaller distance between the to-be-processed pixel and the pixel at the central location of the region corresponding to the dynamic mapping information indicates a larger corresponding weighting coefficient.

For example, a method for determining the weighting coefficients $W_1$, $W_2$, and $W_3$ based on $D_1$, $D_2$, and $D_3$ is as follows:

$$W_1 = \frac{D_2 + D_3}{2 \times (D_1 + D_2 + D_3)}$$

$$W_2 = \frac{D_1 + D_3}{2 \times (D_1 + D_2 + D_3)}$$

$$W_3 = \frac{D_1 + D_2}{2 \times (D_1 + D_2 + D_3)}$$

Optionally, with reference to FIG. 3, as shown in FIG. 13, before the dynamic mapping information of each pixel in the current angle of view range is determined based on the respective dynamic mapping information of the plurality of regions (that is, before step 304), the dynamic range mapping method for a panoramic video provided in embodiments of the present disclosure further includes step 306 and step 307.

Step 306: The electronic device obtains a correspondence between a region and a metadata information element.

Step 307: The electronic device determines, from the metadata according to the correspondence between a region and a metadata information element, the metadata information elements separately corresponding to the plurality of regions, to determine the respective dynamic mapping information of the plurality of regions.

Optionally, the correspondence between a region and a metadata information element may be a one-to-one relationship, or may be a many-to-one relationship. In other words, one region of the two-dimensional panoramic projection image corresponds to one metadata information element, or the plurality of regions of the two-dimensional panoramic projection image correspond to one metadata information element. Optionally, when a luminance difference between the plurality of regions of the two-dimensional panoramic projection image is large, and one type of dynamic mapping information is used for each region, the correspondence between a region and a metadata information element is a one-to-one relationship. When luminance of several regions in the plurality of regions is similar, the several regions may use a same type of dynamic mapping information, and the correspondence between a region and a metadata information element is a many-to-one relationship.

In embodiments of the present disclosure, the correspondence between a region and a metadata information element is a correspondence between an index of the metadata information element and an index of the region; or the correspondence between a region and a metadata information element is a correspondence between an index of the metadata element and coordinates of one or more pixels in the region.

For example, it is assumed that the two-dimensional panoramic projection image is split into six regions (refer to FIG. 6). Table 2 is an example of a correspondence between an index of the metadata information element and an index of the region.

TABLE 2

| Index of a metadata information element | Index of a region |
| --- | --- |
| 0 | 4 |
| 1 | 0 |
| 2 | 5 |
| 3 | 3 |
| 4 | 1 |
| 5 | 2 |

It can be learned from Table 2 that the correspondence between an index of the metadata information element and an index of the region is essentially a traversal order relationship. Refer to FIG. 6. A sequence of the six regions in the two-dimensional panoramic projection image is the region 4, the region 0, the region 5, the region 3, the region 1, and the region 2 from left to right and from top to bottom. Therefore, in the table of the correspondence between regions and metadata information elements shown in Table 2, the six regions in the two-dimensional panoramic projection image are sequentially traversed from left to right and from top to bottom, and metadata information elements separately corresponding to the six regions may be sequentially determined in metadata.

In an implementation, the traversal order of the plurality of regions may be indicated in a bitstream. For example, indication information indicating the traversal order may be carried in the metadata. The traversal order is not limited to the foregoing order from left to right and from top to bottom, and the traversal order is specifically related to a location of each region in the two-dimensional panoramic projection image.

For another example, it is assumed that the two-dimensional panoramic projection image is split into six regions. Table 3 is an example of a correspondence between an index of the metadata information element and coordinates of one or more pixels in the region.

TABLE 3

| Index of a metadata information element | Coordinates of a pixel in a region |
| --- | --- |
| 0 | $(x_0, y_0)$ |
| 1 | $(x_1, y_1)$ |
| 2 | $(x_2, y_2)$ |
| 3 | $(x_3, y_3)$ |
| 4 | $(x_4, y_4)$ |
| 5 | $(x_5, y_5)$ |

With reference to Table 3, in an implementation, coordinates of the pixel of the region in Table 3 may also be carried in metadata. Specifically, the coordinates of the pixel of each region are carried in a metadata information element corresponding to each region. After splitting the two-dimensional panoramic projection image to obtain the plurality of regions, for one of the regions, the display end determines, according to the correspondence shown in Table 3, a pixel corresponding to which coordinates belong to the region, and uses a metadata information element corresponding to the coordinate as a metadata information element of the region. For example, for the region 1 in the six regions, a relationship between a pixel corresponding to each coordinate in Table 3 and the region 1 is sequentially determined. It is determined that a pixel corresponding to the coordinates $(x_4, y_4)$ belongs to the region 1. Therefore, a metadata information element whose index is 4 and that corresponds to the coordinates $(x_4, y_4)$ is used as a metadata information element of the region 1.

Optionally, in embodiments of the present disclosure, the traversal order of the plurality of regions may be a preset order. Alternatively, the generation end determines a traversal order from candidate traversal orders according to a related algorithm, adds an identifier to the metadata of the bitstream, and transfers the bitstream to the generation end, to indicate the traversal order. For example, which traversal order is used may be determined by using the following method:

S111: Calculate a histogram of each of the plurality of regions.

S112: For each of the candidate traversal orders, calculate a sum of difference values between histograms of adjacent regions.

It is assumed that there are four candidate traversal orders: a traversal order $Z_1$, a traversal order $Z_2$, a traversal order $Z_3$, and a traversal order $Z_4$.

The example in which the two-dimensional panoramic projection image is split into six regions is still used. For a candidate traversal order (which is denoted as $Z_1$) that is from left to right and from top to bottom, it is assumed that the six regions are sequentially the region 4, the region 0, the region 5, the region 3, the region 1, and the region 2. Calculation is performed on a difference (which is denoted as DiffHIS_1) between a histogram of the region 4 and a histogram of the region 0, a difference (which is denoted as DiffHIS_2) between the histogram of the region 0 and a histogram of the region 5, a difference (which is denoted as DiffHIS_3) between the histogram of the region 5 and a histogram of the region 3, a difference (which is denoted as DiffHIS_4) between the histogram of the region 3 and a histogram of the region 1, and a difference (which is denoted as DiffHIS_5) between the histogram of the region 1 and a histogram of the region 2. A sum of differences is calculated, to obtain DiffHIS_$Z_1$. Similarly, DiffHIS_$Z_2$, DiffHIS_$Z_3$, and DiffHIS_$Z_4$ may be obtained through calculation.

S113: Determine a traversal order, in the candidate traversal orders, with a minimum sum of differences between histograms as a final traversal order.

For example, values of DiffHIS_$Z_1$, DiffHIS_$Z_2$, DiffHIS_$Z_3$, and DiffHIS_$Z_4$ are compared, and a traversal order with a minimum sum of differences between histograms is determined as a final traversal order.

Optionally, in embodiments of the present disclosure, a preset algorithm may also be used to determine whether the correspondence between the plurality of regions in the two-dimensional panoramic image and the metadata information elements is a one-to-one relationship or a many-to-one relationship. For example, whether to use a one-to-one relationship or a many-to-one relationship may be determined by using the following method:

S1111: Cluster the plurality of regions.

A quantity of clustered categories may be set based on a requirement, for example, set to a half of a quantity of regions or a quarter of a quantity of regions. For example, if a total quantity of regions is 8, eight regions may be split into two categories, which is equivalent to obtaining two large regions, or eight regions may be split into four categories, which is equivalent to obtaining four large regions.

S1112: Calculate a sum of differences between histograms of regions corresponding to the categories and the histogram of the two-dimensional panoramic projection image, and calculate a sum of differences between histograms of the plurality of original regions and the histogram of the two-dimensional panoramic image.

For example, in a clustering result, the sum of the differences between the histograms of regions corresponding to the categories and the histogram of the two-dimensional panoramic projection image is denoted as DiffHIS_X, and the sum of the differences between the histograms of the plurality of original regions and the histogram of the two-dimensional panoramic image is denoted as DiffHIS_org.

S1113: Determine, based on two sums of differences between histograms, whether the correspondence between a plurality of regions and metadata information elements is a one-to-one relationship or a many-to-one relationship.

For example, when two categories of regions are obtained by clustering the eight regions, the sum of the differences between the histograms of the regions corresponding to the categories in the clustering result and the histogram of the two-dimensional panoramic projection image is DiffHIS_X2, and the sum of the differences between the histograms of the plurality of original regions and the histogram of the two-dimensional panoramic image is denoted as DiffHIS_org. A determining method is as follows: If DiffHIS_org×(1−T2)>DiffHIS_X2, the correspondence between regions and metadata information elements is a many-to-one relationship; or if DiffHIS_org×(1−T2)≤DiffHIS_X2, the correspondence between regions and metadata information elements is a one-to-one relationship, where T2 is the preset threshold.

Optionally, with reference to FIG. 13, as shown in FIG. 14, after step 305, the dynamic range mapping method for a panoramic video provided in embodiments of the present disclosure further includes step 308.

Step 308: The electronic device performs subsequent processing on the two-dimensional panoramic projection image in the current angle of view range, where the subsequent processing includes: performing three-dimensional conversion on the two-dimensional panoramic projection image in the current angle of view range, to obtain a three-dimensional panoramic image in the current angle of view range, where the three-dimensional panoramic image is used for display.

In embodiments of the present disclosure, the two-dimensional panoramic projection image obtained in step 305 may be used for display. Further, the two-dimensional panoramic projection image is further used for the subsequent processing, for example, the two-dimensional panoramic projection image is converted into a three-dimensional panoramic image for display. Further, after all three-dimensional panoramic images of the panoramic video are obtained, the panoramic video may be played.

In conclusion, embodiments of the present disclosure provide a dynamic range mapping method for a panoramic video. The electronic device splits the two-dimensional panoramic projection image corresponding to the three-dimensional panoramic image, to obtain the plurality of regions of the two-dimensional panoramic projection image. Each of the plurality of regions meets the preset condition, and the preset condition includes at least one of the following conditions: pixels that are adjacent in the two-dimensional panoramic projection image and that are not adjacent in the three-dimensional panoramic image are not located in a same region, and pixels that are not adjacent in the three-dimensional panoramic image are not located in a same region. In addition, the electronic device obtains the metadata of the two-dimensional panoramic projection image, where the metadata includes the metadata information elements separately corresponding to the plurality of regions of the two-dimensional panoramic projection image, and a metadata information element corresponding to one region includes dynamic mapping information of the region. Then, the electronic device determines the dynamic mapping information of each pixel in the current angle of view range based on the respective dynamic mapping information of the plurality of regions, and performs dynamic range mapping on each pixel in the current angle of view range based on the dynamic mapping information of each pixel in the current angle of view range (an angle of view range of the user that currently watches the panoramic video), to obtain the two-dimensional panoramic projection image in the current angle of view range, where the two-dimensional panoramic projection image in the current angle of view range is used for display or subsequent processing. In the dynamic range mapping method for a panoramic video provided in embodiments of the present disclosure, with reference to a feature that a dynamic range of a panoramic video is large, the electronic device splits the two-dimensional panoramic projection image corresponding to the three-dimensional panoramic image, to obtain the regions, and performs dynamic range mapping on different regions. This can effectively implement dynamic range mapping on the panoramic video, thereby improving display effect of the panoramic video.

Correspondingly, embodiments of the present disclosure provide a dynamic range mapping apparatus for a panoramic video. The apparatus may be used in an electronic device. In embodiments of the present disclosure, the apparatus may be divided into functional modules based on the foregoing method examples. For example, functional modules corresponding to the functions may be obtained through division, or two or more functions may be integrated into one processing module. The integrated module may be implemented in a form of hardware, or may be implemented in a form of a software functional module. It should be noted that in embodiments of the present disclosure, module division is an example, and is merely a logical function division. During actual implementation, another division manner may be used.

Figure 15:
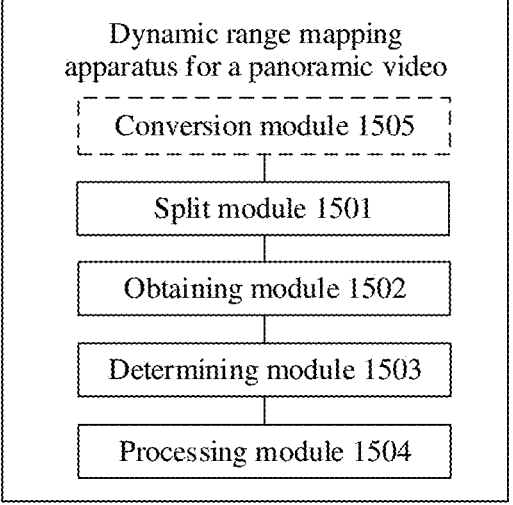
FIG. 15 is a diagram 1 of a structure of an example dynamic range mapping apparatus for a panoramic video according to an embodiment of the present disclosure.

When each functional module is obtained through division based on each corresponding function, FIG. 15 is a diagram of a possible structure of the dynamic range mapping apparatus for a panoramic video in the foregoing embodiments. As shown in FIG. 15, the apparatus includes a split module 1501, an obtaining module 1502, a determining module 1503, and a processing module 1504. The split module 1501 is configured to split a two-dimensional panoramic projection image, to obtain a plurality of regions of the two-dimensional panoramic projection image, for example, perform step 302 in the method embodiments. The two-dimensional panoramic projection image is a two-dimensional panoramic projection image corresponding to any frame of three-dimensional panoramic image in a panoramic video, each of the plurality of regions meets a preset condition, and the preset condition includes at least one of the following conditions: pixels that are adjacent in the two-dimensional panoramic projection image and that are not adjacent in the three-dimensional panoramic image are not located in a same region, and pixels that are not adjacent in the three-dimensional panoramic image are not located in a same region. The pixel points that are adjacent in the two-dimensional panoramic projection image include pixels on at least two adjacent projection planes of the three-dimensional panoramic image, and the pixels that are not adjacent in the three-dimensional panoramic image include pixels that are in the three-dimensional panoramic image and that correspond to at least two non-adjacent projection planes. The obtaining module 1502 is configured to obtain metadata of the two-dimensional panoramic projection image, for example, perform step 303 in the method embodiments. The metadata includes metadata information elements separately corresponding to the plurality of regions of the two-dimensional panoramic projection image, and a metadata information element corresponding to one region includes dynamic mapping information of the region. The determining module 1503 is configured to determine dynamic mapping information of each pixel in a current angle of view range based on respective dynamic mapping information of the plurality of regions, for example, perform step 304 in the method embodiments. The processing module 1504 is configured to perform dynamic range mapping on each pixel in the current angle of view range based on the dynamic mapping information of each pixel in the current angle of view range, to obtain a two-dimensional panoramic projection image in the current angle of view range, for example, perform step 305 in the method embodiments. The two-dimensional panoramic projection image in the current angle of view range is used for display or subsequent processing.

Optionally, the dynamic range mapping apparatus for a panoramic video provided in embodiments of the present disclosure further includes a conversion module 1505. The conversion module 1505 is configured to project the three-dimensional panoramic image onto a surface of a polyhedron, and extend the polyhedron into a two-dimensional plane, to obtain the two-dimensional panoramic projection image, for example, perform step 301 in the method embodiments. The polyhedron includes at least one of: a regular tetrahedron, a regular hexahedron, a regular octahedron, a regular dodecahedron, or a regular icosahedron.

Optionally, the split module 1501 is further configured to split the two-dimensional panoramic projection image in a first split manner, to obtain the plurality of regions of the two-dimensional panoramic projection image, for example, perform step 3021 in the method embodiments. The first split manner is splitting pixels, in the two-dimensional panoramic projection image, belonging to a same surface of the polyhedron into a region.

Optionally, the split module 1501 is specifically configured to split the two-dimensional panoramic projection image in a second split manner, to obtain the plurality of regions of the two-dimensional panoramic projection image, for example, perform step 3022 in the method embodiments. The second split manner is splitting pixels, in the two-dimensional panoramic projection image, belonging to a same surface of the polyhedron into a region, to obtain a plurality of intermediate regions, and further splitting at least one of the plurality of intermediate regions.

Optionally, the split module 1501 is specifically configured to: split the two-dimensional panoramic projection image in a third split manner, to obtain a plurality of intermediate regions of the two-dimensional panoramic projection image, where the third split manner is clustering all pixels in the two-dimensional panoramic projection image, and splitting pixels belonging to a same category into a same intermediate region; and split, in a fourth split manner, an intermediate region that does not meet the preset condition in the plurality of intermediate regions, to obtain the plurality of regions, for example, perform step 3023 and step 3024 in the method embodiments. For any intermediate region that does not meet the preset condition, the fourth split manner is splitting the intermediate region along a boundary line of at least two surfaces, included in the intermediate region, of the polyhedron.

Optionally, the obtaining module 1502 is further configured to obtain a correspondence between a region and a metadata information element, for example, perform step 306 in the method embodiments. The determining module 1503 is further configured to determine, from the metadata according to the correspondence between a region and a metadata information element, the metadata information elements separately corresponding to the plurality of regions, to determine the respective dynamic mapping information of the plurality of regions, for example, perform step 307 in the method embodiments.

Optionally, the obtaining module 1502 is specifically configured to receive the metadata of the two-dimensional panoramic projection image from another electronic device.

Optionally, the conversion module 1505 is further configured to perform subsequent processing on the two-dimensional panoramic projection image in the current angle of view range, for example, perform step 308 in the method embodiments. The subsequent processing includes: performing three-dimensional conversion on the two-dimensional panoramic projection image in the current angle of view range, to obtain a three-dimensional panoramic image in the current angle of view range. The three-dimensional panoramic image is used for display.

The modules of the dynamic range mapping apparatus for a panoramic video may be further configured to perform other actions in the method embodiments. All related content of the steps in the method embodiments may be cited to function descriptions of corresponding functional modules. Details are not described herein again.

Figure 16:
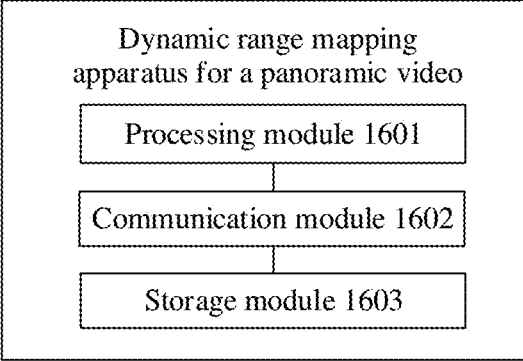
FIG. 16 is a diagram 2 of a structure of an example dynamic range mapping apparatus for a panoramic video according to an embodiment of the present disclosure.

When an integrated unit is used, FIG. 16 is a diagram of another possible structure of a dynamic range mapping apparatus for a panoramic video in the foregoing embodiments. As shown in FIG. 16, the dynamic range mapping apparatus for a panoramic video provided in embodiments of the present disclosure may include a processing module 1601 and a communication module 1602. The processing module 1601 may be configured to control and manage an action of the apparatus. For example, the processing module 1601 may be configured to support the apparatus in performing step 301 to step 305, step 306, step 307, and step 308 in the method embodiments, and/or performing another process of the technology described in this specification. The communication module 1602 is configured to support the apparatus in communicating with another network entity, for example, communicating with another electronic device (a generation end). Optionally, as shown in FIG. 16, the dynamic range mapping apparatus for a panoramic video may further include a storage module 1603, configured to store program code and data of the apparatus, for example, storing metadata.

The processing module 1601 may be a processor or a controller (for example, may be the processor 210 shown in FIG. 2). The processor may alternatively be a combination of processors implementing a computing function, for example, a combination of one or more microprocessors, or a combination of a DSP and a microprocessor. The communication module 1602 may be a transceiver, a transceiver circuit, a communication interface, or the like (for example, may be the mobile communication module 250 or the wireless communication module 260 shown in FIG. 2). The storage module 1603 may be a memory (for example, may be the internal memory 221 shown in FIG. 2).

When the processing module 1601 is the processor, the communication module 1602 is the transceiver, and the storage module 1603 is the memory, the processor, the transceiver, and the memory may be connected through a bus. The bus may be a peripheral component interconnect (PCI) bus, an extended industry standard architecture (EISA) bus, or the like. Buses may be classified into an address bus, a data bus, a control bus, and the like.

For more details of implementing the foregoing functions by the modules included in the dynamic range mapping apparatus for a panoramic video, refer to the descriptions in the method embodiments. Details are not described herein again.

Embodiments in this specification are all described in a progressive manner. For same or similar parts in embodiments, refer to these embodiments. Each embodiment focuses on a difference from other embodiments.

All or some of the embodiments may be implemented by using software, hardware, firmware, or any combination thereof. When a software program is used to implement embodiments, embodiments may be implemented completely or partially in a form of a computer program product. The computer program product includes one or more computer instructions. When the computer instructions are loaded and executed on a computer, all or some of the procedures or functions according to embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid-state drive (SSD)), or the like.

The foregoing descriptions about implementations allow a person skilled in the art to understand that, for the purpose of convenient and brief description, division into the foregoing functional modules is taken as an example for illustration. During actual application, the foregoing functions can be allocated to different modules and implemented based on a requirement, that is, an inner structure of an apparatus is divided into different functional modules to implement all or some of the functions described above. For a detailed working process of the foregoing system, apparatus, and unit, refer to a corresponding process in the method embodiments, and details are not described herein again.

In the several embodiments provided in the present disclosure, it should be understood that the disclosed system, apparatus, and method may be implemented in another manner. For example, the described apparatus embodiments are merely examples. For example, the division into the modules or units is merely logical function division and may be other division during actual implementation. For example, a plurality of units or assemblies may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electronic form, a mechanical form, or another form.

Units described as separate parts may or may not be physically separate, and parts displayed as units may or may not be physical units, may be located in one position, or may be distributed on a plurality of network units. Some or all of the units may be selected based on actual requirements to achieve objectives of the solutions of the embodiments.

In addition, functional units in embodiments of the present disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the present disclosure essentially, or the part contributing to the conventional technology, or all or some of the technical solutions may be implemented in the form of a software product. The software product is stored in a storage medium and includes several instructions for instructing a computer device or a processor (which may be a personal computer, a server, or a network device) to perform all or some of the steps of the methods described in embodiments of the present disclosure. The foregoing storage medium includes any medium that can store program code, for example, a flash memory, a removable hard disk, a read-only memory, a random access memory, a magnetic disk, or an optical disc.

The foregoing descriptions are merely specific implementations of the present disclosure, but are not intended to limit the protection scope of the present disclosure. Any variation or replacement within the technical scope disclosed in the present disclosure shall fall within the protection scope of the present disclosure. Therefore, the protection scope of the present disclosure shall be subject to the protection scope of the claims.

What is claimed is:

1. A dynamic range mapping method for a panoramic video, applied to an electronic device, wherein the method comprises:

splitting a two-dimensional panoramic projection image, to obtain a plurality of regions of the two-dimensional panoramic projection image, wherein the two-dimensional panoramic projection image corresponds to any frame of three-dimensional panoramic image in a panoramic video, each of the plurality of regions meets at least one of the following conditions:

1) pixels that are adjacent in the two-dimensional panoramic projection image and that are not adjacent in the three-dimensional panoramic image are not located in a same region, or 2) pixels that are not adjacent in the three-dimensional panoramic image are not located in a same region, wherein the pixels that are adjacent in the two-dimensional panoramic projection image comprise pixels on at least two adjacent projection planes of the three-dimensional panoramic image, and the pixels that are not adjacent in the three-dimensional panoramic image comprise pixels that are in the three-dimensional panoramic image and that correspond to at least two non-adjacent projection planes;

obtaining metadata of the two-dimensional panoramic projection image, wherein the metadata comprises metadata information elements separately corresponding to the plurality of regions of the two-dimensional panoramic projection image, and a metadata information element corresponding to one of the plurality of regions comprises dynamic mapping information of the region;

determining dynamic mapping information of each pixel in a current angle of view range based on respective dynamic mapping information of the plurality of regions; and performing dynamic range mapping on each pixel in the current angle of view range based on the dynamic mapping information of each pixel in the current angle of view range, to obtain a two-dimensional panoramic projection image in the current angle of view range for display or subsequent processing.

2. The method according to claim 1, further comprising:

projecting the three-dimensional panoramic image onto a surface of a polyhedron, and extending the polyhedron into a two-dimensional plane, to obtain the two-dimensional panoramic projection image.

3. The method according to claim 2, wherein the splitting a two-dimensional panoramic projection image, to obtain a plurality of regions of the two-dimensional panoramic projection image comprises:

splitting the two-dimensional panoramic projection image in a first split manner, to obtain the plurality of regions of the two-dimensional panoramic projection image, wherein the first split manner is splitting pixels, in the two-dimensional panoramic projection image, belonging to a same surface of the polyhedron into a region.

4. The method according to claim 2, wherein the splitting a two-dimensional panoramic projection image, to obtain a plurality of regions of the two-dimensional panoramic projection image comprises:

splitting the two-dimensional panoramic projection image in a second split manner, to obtain the plurality of regions of the two-dimensional panoramic projection image, wherein the second split manner is splitting pixels, in the two-dimensional panoramic projection image, belonging to a same surface of the polyhedron into a region, to obtain a plurality of intermediate regions; and further splitting at least one of the plurality of intermediate regions.

5. The method according to claim 2, wherein the splitting a two-dimensional panoramic projection image, to obtain a plurality of regions of the two-dimensional panoramic projection image comprises:

splitting the two-dimensional panoramic projection image in a third split manner, to obtain a plurality of intermediate regions of the two-dimensional panoramic projection image, wherein the third split manner is clustering all pixels in the two-dimensional panoramic projection image, and splitting pixels belonging to a same category into a same intermediate region; and splitting, in a fourth split manner, an intermediate region that does not meet the preset condition in the plurality of intermediate regions, to obtain the plurality of regions, wherein for any intermediate region in the plurality of intermediate regions that does not meet the preset condition, the fourth split manner is splitting the intermediate region along a boundary line of at least two surfaces, comprised in the intermediate region, of the polyhedron.

6. The method according to claim 1, wherein the metadata of the two-dimensional panoramic projection image further comprises split manner indication information indicating a split manner of the two-dimensional panoramic projection image.

7. The method according to claim 1, wherein before the determining dynamic mapping information of each pixel in a current angle of view range based on respective dynamic mapping information of the plurality of regions, the method further comprises:

obtaining a correspondence between a region and a metadata information element; and determining, from the metadata according to the correspondence between a region and a metadata information element, the metadata information elements separately corresponding to the plurality of regions, to determine the respective dynamic mapping information of the plurality of regions.

8. The method according to claim 7, wherein the correspondence between a region and a metadata information element is a correspondence between an index of the metadata information element and an index of the region.

9. The method according to claim 7, wherein the correspondence between a region and a metadata information element is a correspondence between an index of the metadata information element and coordinates of one or more pixels in the region.

10. The method according to claim 1, wherein dynamic mapping information of a to-be-processed pixel in the current angle of view range is dynamic mapping information of a plurality of regions in a first preset range, and the first preset range is a range centered on the to-be-processed pixel.

11. The method according to claim 1, wherein dynamic mapping information of a to-be-processed pixel in the current angle of view range is dynamic mapping information of a region to which a pixel that corresponds to a viewpoint center of the current angle of view range and that is in the two-dimensional panoramic projection image belongs.

12. The method according to claim 1, wherein dynamic mapping information of a to-be-processed pixel in the current angle of view range is dynamic mapping information of a plurality of regions in a second preset range, and the second preset range is a range centered on a pixel that corresponds to a viewpoint center of the current angle of view range and that is in the two-dimensional panoramic projection image.

13. The method according to claim 1, wherein dynamic mapping information of one pixel in a region is dynamic mapping information of the region.

14. A dynamic range mapping apparatus for a panoramic video, comprising:

a memory configured to store instructions;

at least one processor coupled to the memory, and configured to execute the instructions to cause the dynamic range mapping apparatus to:

split a two-dimensional panoramic projection image, to obtain a plurality of regions of the two-dimensional panoramic projection image, wherein the two-dimensional panoramic projection image corresponds to any frame of three-dimensional panoramic image in a panoramic video, each of the plurality of regions meets at least one of the following conditions:

1) pixels that are adjacent in the two-dimensional panoramic projection image and that are not adjacent in the three-dimensional panoramic image are not located in a same region, or 2) pixels that are not adjacent in the three-dimensional panoramic image are not located in a same region, wherein the pixels that are adjacent in the two-dimensional panoramic projection image comprise pixels on at least two adjacent projection planes of the three-dimensional panoramic image, and the pixels that are not adjacent in the three-dimensional panoramic image comprise pixels that are in the three-dimensional panoramic image and that correspond to at least two non-adjacent projection planes;

obtain metadata of the two-dimensional panoramic projection image, wherein the metadata comprises metadata information elements separately corresponding to the plurality of regions of the two-dimensional panoramic projection image, and a metadata information element corresponding to one of the plurality of regions comprises dynamic mapping information of the region;

determine dynamic mapping information of each pixel in a current angle of view range based on respective dynamic mapping information of the plurality of regions; and perform dynamic range mapping on each pixel in the current angle of view range based on the dynamic mapping information of each pixel in the current angle of view range, to obtain a two-dimensional panoramic projection image in the current angle of view range for display or subsequent processing.

15. The apparatus according to claim 14, wherein the at least one processor configured to execute the instructions to cause the dynamic range mapping apparatus to:

project the three-dimensional panoramic image onto a surface of a polyhedron, and extend the polyhedron into a two-dimensional plane, to obtain the two-dimensional panoramic projection image.

16. The apparatus according to claim 15, wherein the instructions, when executed by the at least one processor, to further cause the dynamic range mapping apparatus to:

split the two-dimensional panoramic projection image in a first split manner, to obtain the plurality of regions of the two-dimensional panoramic projection image, wherein the first split manner is splitting pixels, in the two-dimensional panoramic projection image, belonging to a same surface of the polyhedron into a region.

17. The apparatus according to claim 15, wherein the instructions, when executed by the at least one processor, further cause the dynamic range mapping apparatus to:

split the two-dimensional panoramic projection image in a second split manner, to obtain the plurality of regions of the two-dimensional panoramic projection image, wherein the second split manner is splitting pixels, in the two-dimensional panoramic projection image, belonging to a same surface of the polyhedron into a region, to obtain a plurality of intermediate regions, and further split at least one of the plurality of intermediate regions.

18. The apparatus according to claim 14, wherein the metadata of the two-dimensional panoramic projection image further comprises split manner indication information indicating a split manner of the two-dimensional panoramic projection image.

19. The apparatus according to claim 14, wherein the instructions, when executed by the at least one processor, further cause the dynamic range mapping apparatus to:

obtain a correspondence between a region and a metadata information element; and determine, from the metadata according to the correspondence between a region and a metadata information element, the metadata information elements separately corresponding to the plurality of regions, to determine the respective dynamic mapping information of the plurality of regions.

20. A non-transitory computer readable storage medium, storing a computer program that, when executed by a processor, causes an electronic device to:

split a two-dimensional panoramic projection image, to obtain a plurality of regions of the two-dimensional panoramic projection image, wherein the two-dimensional panoramic projection image corresponds to any frame of three-dimensional panoramic image in a panoramic video, each of the plurality of regions meets at least one of the following conditions:

1) pixels that are adjacent in the two-dimensional panoramic projection image and that are not adjacent in the three-dimensional panoramic image are not located in a same region, or 2) pixels that are not adjacent in the three-dimensional panoramic image are not located in a same region, wherein the pixels that are adjacent in the two-dimensional panoramic projection image comprise pixels on at least two adjacent projection planes of the three-dimensional panoramic image, and the pixels that are not adjacent in the three-dimensional panoramic image comprise pixels that are in the three-dimensional panoramic image and that correspond to at least two non-adjacent projection planes;

obtain metadata of the two-dimensional panoramic projection image, wherein the metadata comprises metadata information elements separately corresponding to the plurality of regions of the two-dimensional panoramic projection image, and a metadata information element corresponding to one of the plurality of regions comprises dynamic mapping information of the region;

determine dynamic mapping information of each pixel in a current angle of view range based on respective dynamic mapping information of the plurality of regions; and perform dynamic range mapping on each pixel in the current angle of view range based on the dynamic mapping information of each pixel in the current angle of view range, to obtain a two-dimensional panoramic projection image in the current angle of view range, for display or subsequent processing.

* * * * *